US011965533B2

(12) United States Patent
Galant

(10) Patent No.: US 11,965,533 B2
(45) Date of Patent: Apr. 23, 2024

(54) COMPONENT SECURING UNIT

(71) Applicant: Compucage International Inc., Kleinberg (CA)

(72) Inventor: Steve N. Galant, Kleinburg (CA)

(*) Notice: Subject to any disclaimer, the term of this patent is extended or adjusted under 35 U.S.C. 154(b) by 120 days.

(21) Appl. No.: 17/848,324

(22) Filed: Jun. 23, 2022

(65) Prior Publication Data
US 2023/0417266 A1 Dec. 28, 2023

(51) Int. Cl.
*E05B 73/00* (2006.01)
*A47F 3/00* (2006.01)
*A47F 7/024* (2006.01)
*F16B 5/02* (2006.01)
*F16B 11/00* (2006.01)

(52) U.S. Cl.
CPC ............ *F16B 11/006* (2013.01); *A47F 3/002* (2013.01); *A47F 7/0246* (2013.01); *E05B 73/0082* (2013.01); *F16B 5/0208* (2013.01); *E05B 73/00* (2013.01)

(58) Field of Classification Search
CPC ...... F16B 11/006; F16B 5/0208; E05B 73/00; E05B 73/0082; E05B 65/00
USPC ............................................. 248/551; 70/58
See application file for complete search history.

(56) References Cited

U.S. PATENT DOCUMENTS

| 10,624,471 | B2 | 4/2020 | Galant | |
| 2009/0173863 | A1* | 7/2009 | Crown | B60R 11/0252 248/316.4 |
| 2011/0187531 | A1* | 8/2011 | Oehl | G08B 13/1445 340/568.1 |
| 2017/0058572 | A1* | 3/2017 | Avganim | E05B 73/0082 |
| 2018/0058107 | A1* | 3/2018 | Lucas | E05B 73/0082 |
| 2022/0408943 | A1* | 12/2022 | Kumka | H02J 7/0044 |

* cited by examiner

*Primary Examiner* — Carson Gross
(74) *Attorney, Agent, or Firm* — David J. Greer; Smart & Biggar LP

(57) ABSTRACT

A component securing unit for mounting to a cooperating surface of a component, including: a component interface defining a first interface surface region and a second interface surface region; a first adhesive material located on the first interface surface region; a second adhesive material having one or more adhesive material properties that are different than adhesive material properties of the first adhesive material, the second adhesive material located on the second interface surface region; the component interface, first adhesive material, and second adhesive material cooperatively configured such that the first adhesive material and second adhesive material can each adhere to respective portions of the cooperating surface to mount the component securing unit to the cooperating surface.

20 Claims, 19 Drawing Sheets

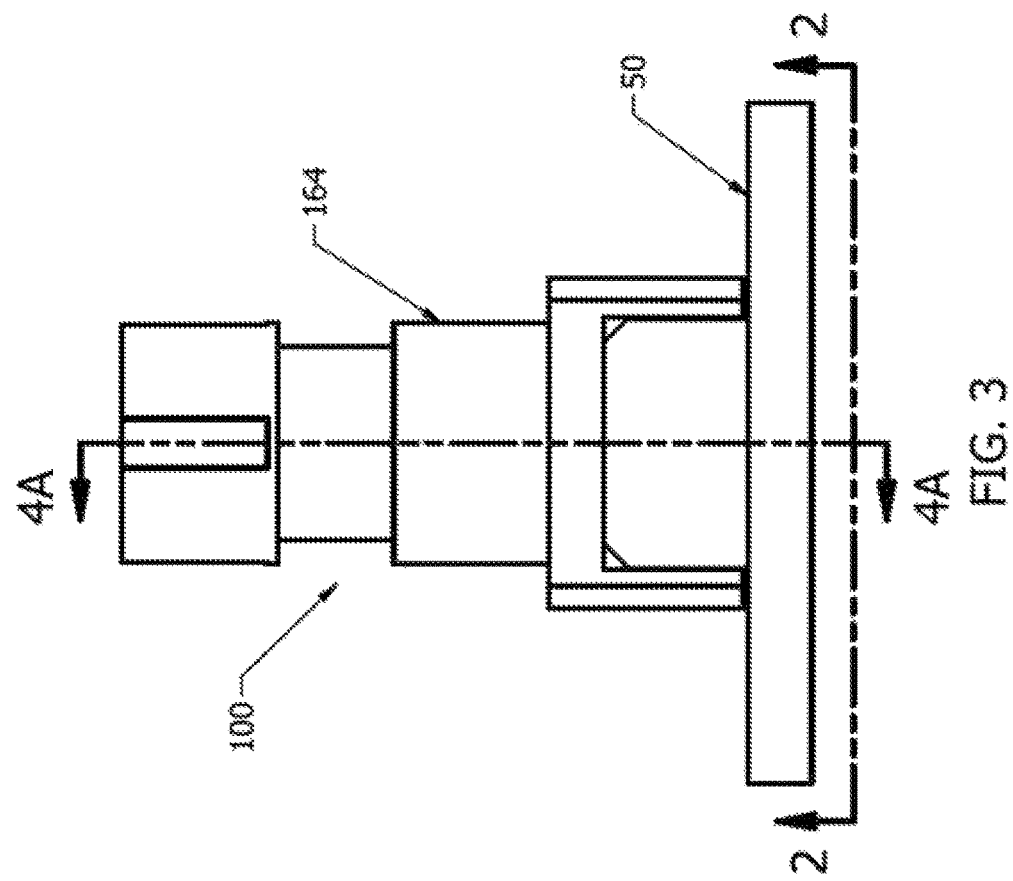
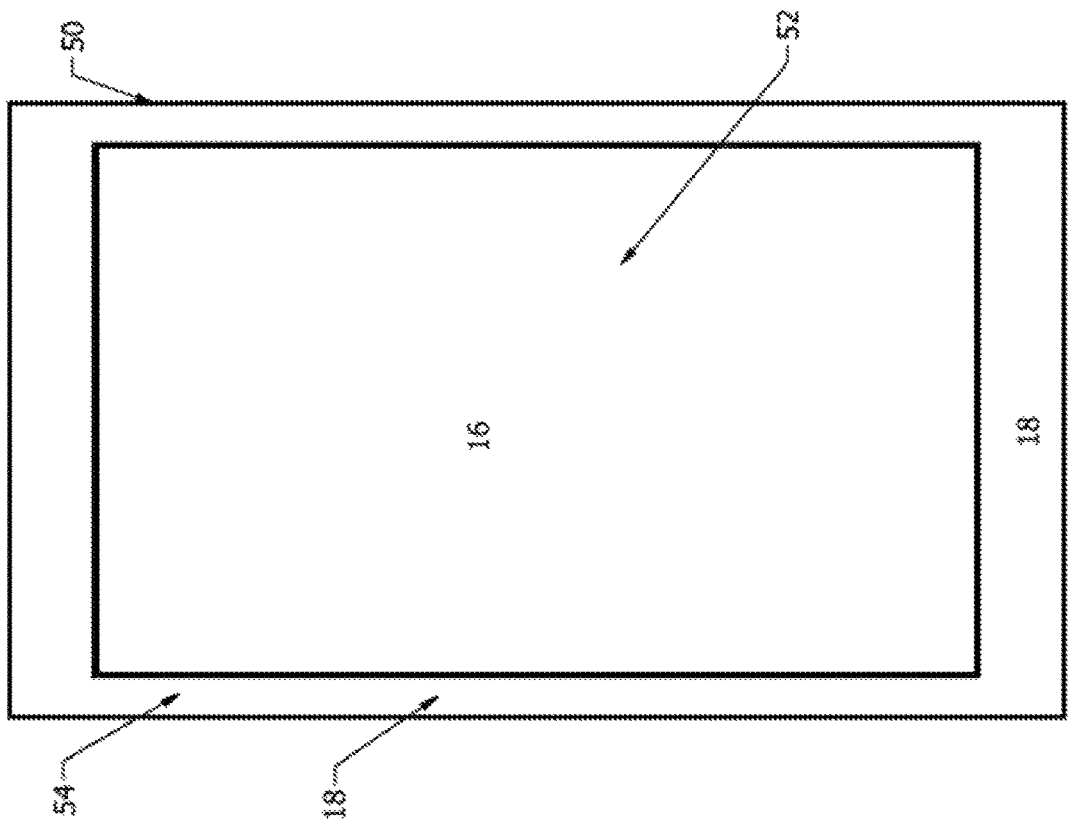

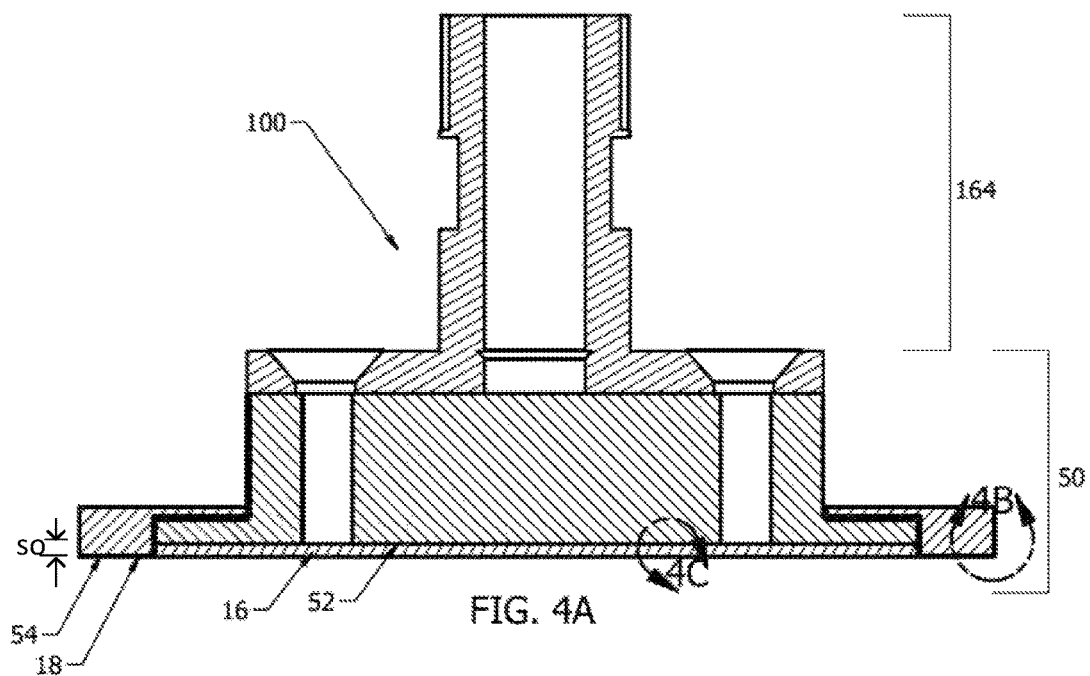
FIG. 4A
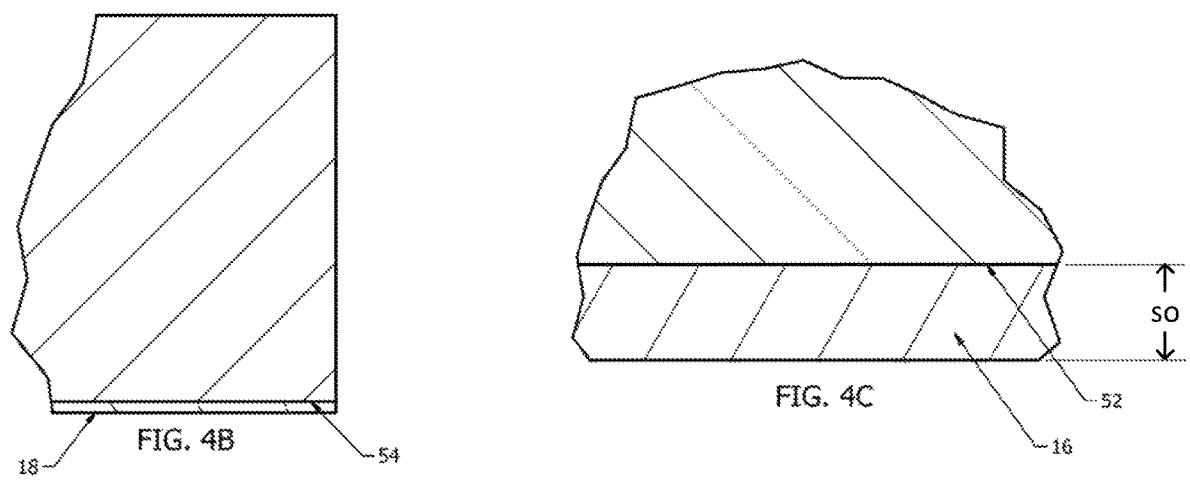
FIG. 4B
FIG. 4C
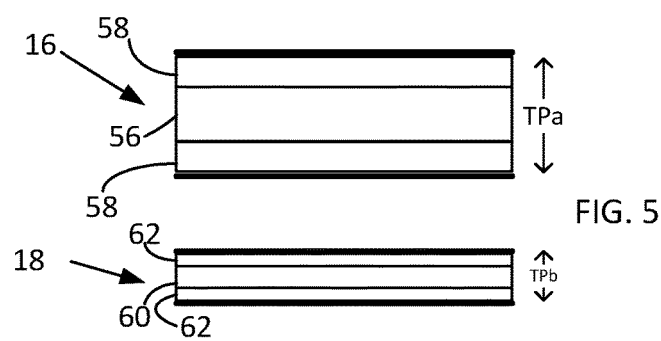
FIG. 5

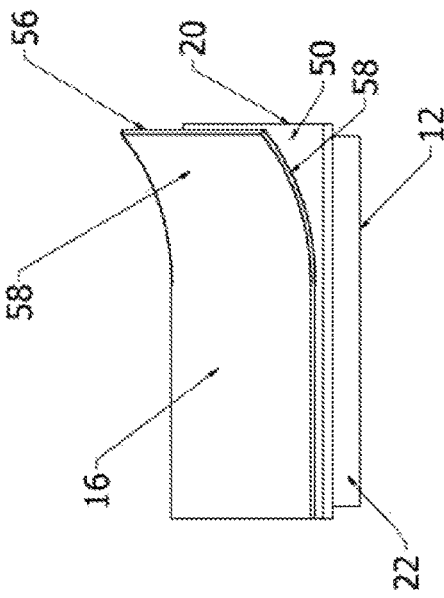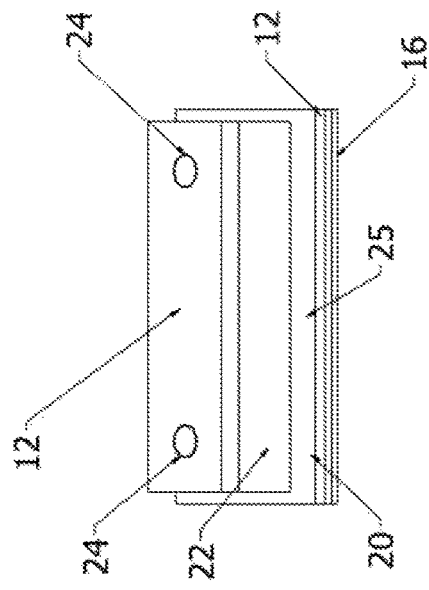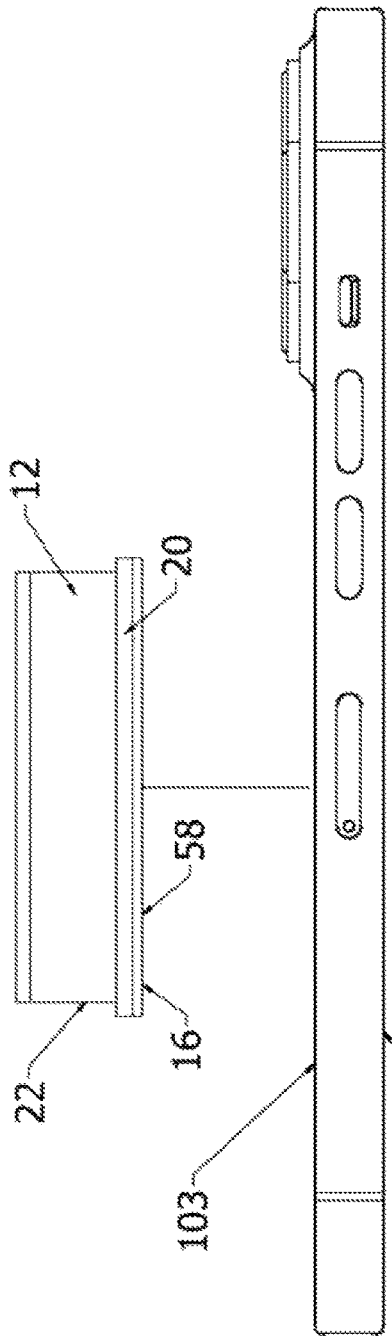
FIG. 8
FIG. 9
FIG. 10

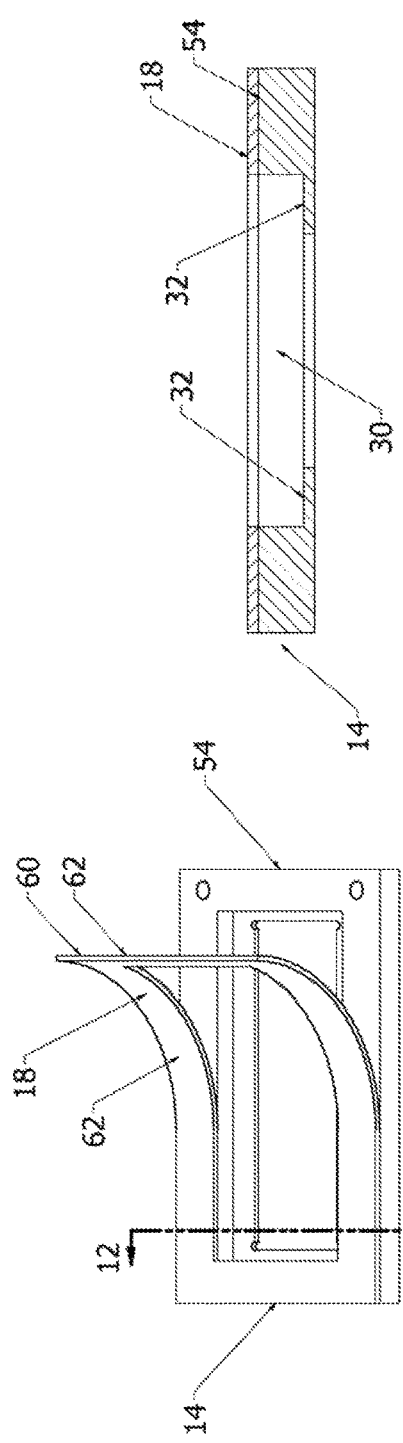
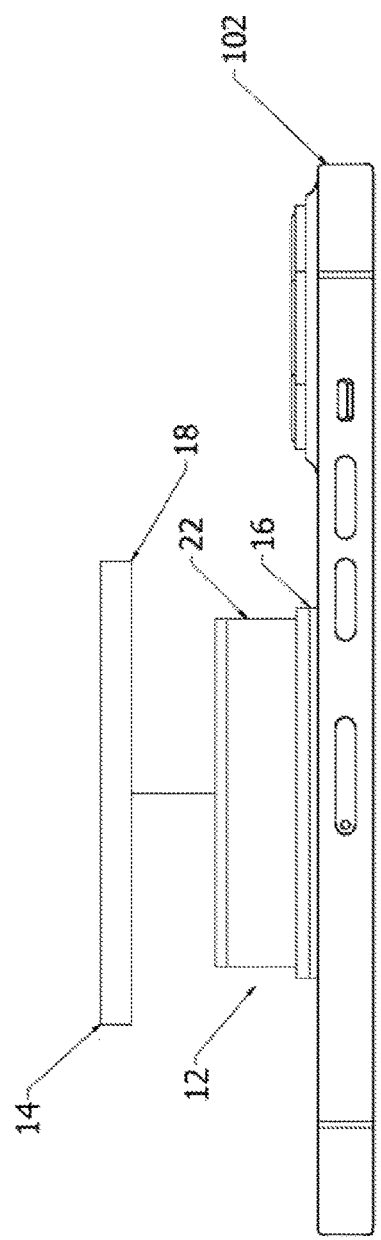

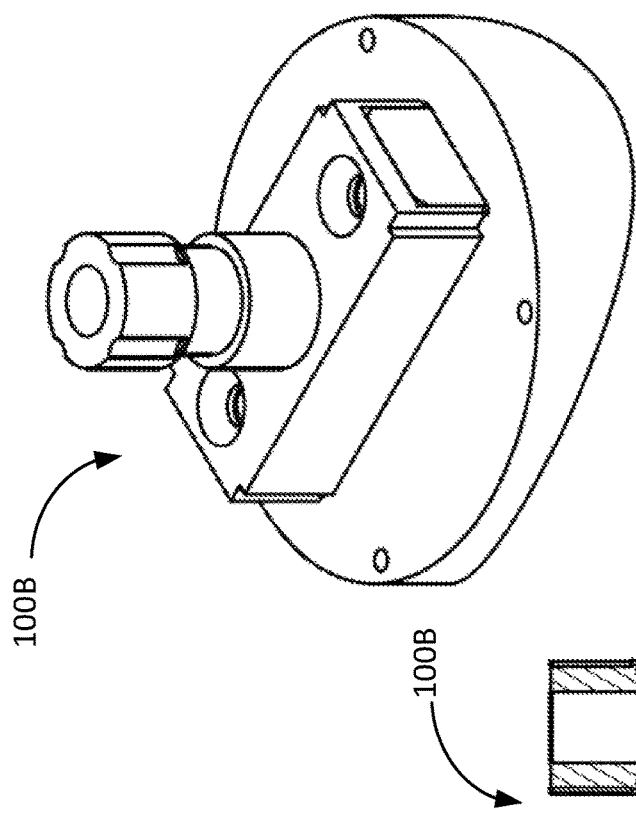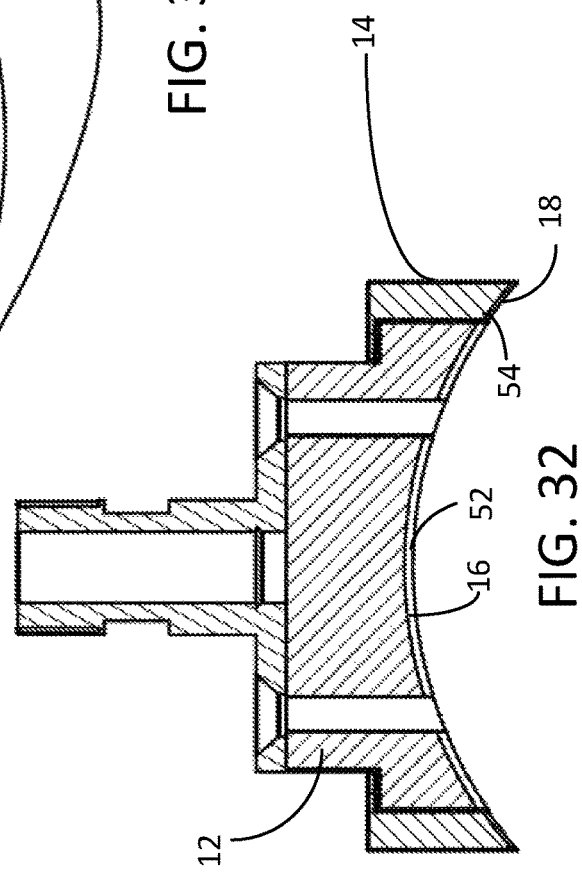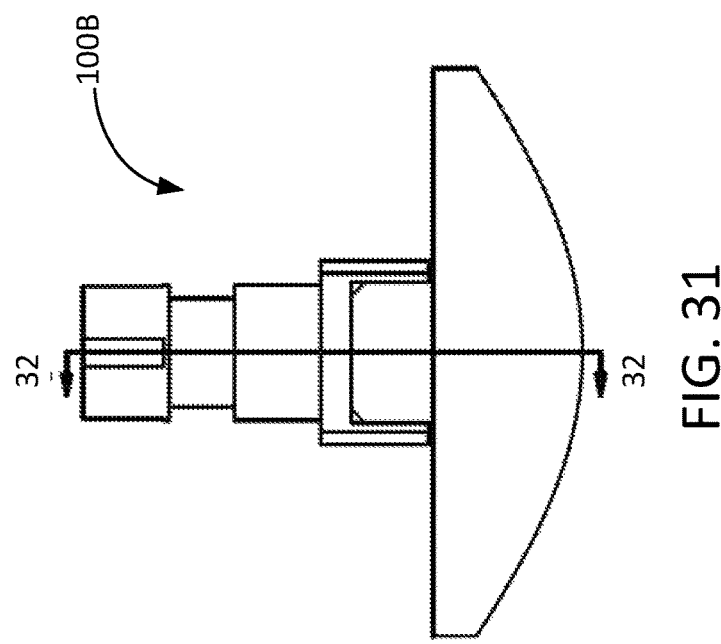
FIG. 30
FIG. 32
FIG. 31

COMPONENT SECURING UNIT

FIELD

This application relates to a component securing unit that can be used for securing a mobile component to prevent theft.

BACKGROUND

Retailers who sell components that are at high risk of theft, such as tablet computers, smart phones, bottled perfume, watches, handbags, and electrical tools for example, typically want to display sample components in a manner that prevents the unauthorized removal while at the same time minimizes interference with the user experience in viewing and interacting with the sample components. Additionally, retailers typically want to avoid permanent damage to or marking of the displayed components that would devalue the components.

An example of a "clamp-style" security device for securing a component is shown in U.S. Pat. No. 10,624,471 B2, assigned to Compucage International Inc. The clamp-style device shown in U.S. Pat. No. 10,624,471 B2 can effectively mitigate theft, however the clamp mechanism can cover substantial surface area of the component that is being secured and thus interfere with a customer's interactive experience with the component. Further, the clamp mechanism must be selected according to device size.

There remains a need for anti-theft product display devices and systems that can be used to securely display a wide range of interactive components while also minimizing the customer's interactive experience with the component.

SUMMARY

According to a first example aspect of the disclosure is a component securing unit for mounting to a cooperating surface of a component. The component securing unit includes a component interface defining a first interface surface region and a second interface surface region; a first adhesive material located on the first interface surface region; and a second adhesive material having one or more adhesive material properties that are different than adhesive material properties of the first adhesive material, the second adhesive material located on the second interface surface region. The component interface, first adhesive material, and second adhesive material co-operatively configured such that the first adhesive material and second adhesive material can each adhere to respective portions of the cooperating surface to mount the component securing unit to the cooperating surface.

According to some examples, the second adhesive material surrounds a periphery of the first adhesive material such that the second adhesive material and component interface provide a protective barrier for the first adhesive material when the component securing unit is mounted to the cooperating surface.

According to one or more example aspects, the first adhesive material has a thicker profile than the second adhesive material and the first interface surface region is set-off relative to the second interface surface region to accommodate the thicker profile.

According to one or more example aspects, the first interface surface region and a second interface surface region are planar regions and parallel to each other.

According to one or more example aspects, the first adhesive material has a thickness profile of greater than 30 mils, the second adhesive material has a thickness profile of less than 10 mils, and the first adhesive material has a greater compressibility than the second adhesive material, and the second adhesive material surrounds a periphery of the first adhesive material.

According to one or more example aspects, the first adhesive material has a thickness profile of greater than 10 mils, the second adhesive material has a thickness profile of less than 8 mils, and the second adhesive material surrounds a periphery of the first adhesive material.

According to one or more example aspects, the component interface includes a first counterpart that defines the first interface surface region and a second counterpart that defines the second interface surface region.

According to one or more example aspects, the component securing unit includes a third counterpart that is removably securable to the component interface, wherein the third counterpart, first counterpart, and second counterpart are co-operatively configured such that the third counterpart, first counterpart, and second counterpart can be locked together using a cooperating locking mechanism.

According to one or more example aspects, the third counterpart, the component interface, first adhesive material, and second adhesive material are co-operatively configured such that, when the component securing unit is mounted to the cooperating surface by the first and second adhesive materials: when the third counterpart, first counterpart, and second counterpart are locked together a first normal tension force or a first shearing force is required to remove the locked together third counterpart, first counterpart, and second counterpart from the cooperating surface; and when the third counterpart, first counterpart, and second counterpart are not locked together by the locking mechanism and the third counterpart is removed from the component interface, the second counterpart can be removed from the cooperating surface discretely of the first component by applying a second normal tension force that is less than the first normal tension force to overcome a bond of the second adhesive material, and the first counterpart can be subsequently removed from the cooperating surface by applying a second shearing force that is less than the first shearing force to overcome a bond of the first adhesive material.

According to one or more example aspects, wherein the component is an electronic component, the third counterpart, the component interface, first adhesive material, and second adhesive material being co-operatively configured such that application of either the first normal tension force or the first shearing force when the third counterpart, first counterpart, and second counterpart are locked together and the component securing unit is mounted to the cooperating surface will destroy the electronic component, but the application of either the second normal tension force or the second shearing force will not destroy the electronic component.

According to one or more example aspects, wherein the locking mechanism comprises a threaded fastener extending through a hole through the third counterpart and into a correspondingly threaded hole of the first counterpart.

According to one or more example aspects, wherein the third counterpart comprises a protruding anchor interface for securing to an anchoring structure.

According to one or more example aspects, wherein the first counterpart includes a first section that defines the first interface surface region and a second section that extends from the first section, and the second counterpart includes a central opening through which the second section extends when the component securing unit is mounted to the cooperating surface, one or more surfaces being defined at the central opening for interacting with cooperating surfaces of the first section to block the first section from passing through central opening.

According to one or more example aspects, wherein the first adhesive material comprises a double sided acrylic foam carrier with an acrylic adhesive located on both sides thereof, and the second adhesive material comprises a double sided polyethylene terephthalate (PET) carrier with a rubber based adhesive located on both sides thereof.

According to one or more example aspects, the component interface, first adhesive material, and second adhesive material being co-operatively configured such that the first adhesive material has a greater normal stress resistance than the second adhesive material and the second adhesive material has a greater shear stress resistance than the first adhesive material.

According to one or more example aspects, wherein the component interface, first adhesive material, and second adhesive material are co-operatively configured such that the component interface and the second adhesive material provide a physical barrier against external access to the first adhesive material when the component securing unit is mounted to the cooperating surface.

According to a second example aspect, a component securing unit for mounting to a component surface is disclosed that includes a first counterpart having a first section defining a first interface surface region; a second counterpart defining a second interface surface region; a first adhesive material located on the first interface surface region; a second adhesive material located on the second interface surface region; the first counterpart and second counterpart co-operatively configured such that the first counterpart can be secured to the component surface with the first adhesive material, and the second counterpart can be secured to the component surface with the second adhesive material with the second adhesive material extending about a periphery of the first adhesive material and the second counterpart blocking removal of the first counterpart from the component surface.

According to one or more examples of the second aspect, the first counterpart has a second section that protrudes from the first section, and the second counterpart defines a central opening through which the second section of the first counterpart can extend, the second counterpart defining one or more surfaces about the central opening for interacting with the first section of the first counterpart, the first counterpart and second counterpart co-operatively configured such that the first counterpart and second counterpart can be secured to the component surface with the first section of the first counterpart extending through the central opening of the second counterpart and the one or more surfaces about the central opening interacting with the first section of the first counterpart to block the removal of the first counterpart from the component surface in a direction normal to the component surface.

According to one or more examples of the second aspect, the first adhesive material has a thicker profile than the second adhesive material and the first interface surface region is set-off relative to the second interface surface region to accommodate the thicker profile.

According to one or more examples of the second aspect, the first interface surface region and a second interface surface region are planar regions and parallel to each other.

According to one or more examples of the second aspect, the component securing unit includes a third counterpart that is removably securable to the first counterpart to lock the first counterpart, second counterpart and third counterpart together.

BRIEF DESCRIPTION OF THE DRAWINGS

Reference will now be made, by way of example, to the accompanying drawings which show example embodiments of the present application, and in which:

FIG. 2 is a front view of the component securing unit;

FIG. 3 is an end view of the component securing unit;

FIG. 4A is a side sectional view of the component securing unit taken along the line F-F of FIG. 3;

FIG. 4B is an enlarged detail view of region H of FIG. 4A;

FIG. 4C is an enlarged detail view of region J of FIG. 4A;

FIG. 5 is and end view showing examples of first and second adhesive materials that are applied to the component securing unit;

FIG. 8 is a back perspective view of a first counterpart of the component securing unit of FIG. 6;

FIG. 9 is a front perspective view of the first counterpart of FIG. 8;

FIG. 10 is a side view of the first counterpart of FIG. 8 being secured to the mobile component;

FIG. 11 is a front perspective view of a second counterpart of the component securing unit of FIG. 6;

FIG. 12 is a sectional view of the second counterpart, taken along the lines XII-XII of FIG. 11;

FIG. 13 is a side view of the second counterpart of FIG. 11 being secured to the mobile component;

FIG. 30 is a perspective view of a further example configuration of a component securing unit, according to a further example implementation;

FIG. 31 is a side view of the component securing unit of FIG. 30; and

FIG. 32 is a sectional view of the component securing unit of FIG. 30, taken along the line 32-32 of FIG. 31.

Similar reference numerals may have been used in different figures to denote similar components.

DESCRIPTION OF EXAMPLE EMBODIMENTS

This document describes example embodiments of a component securing unit that is configured to be mounted to a movable component. In at least some embodiments, the component securing unit can be used to secure a mobile component while minimizing interference with access to and viewing of the component and interface elements of the component such as display screens, touch screens and keyboards. Additionally, in at least some embodiments, the component securing unit does not interfere with venting air paths and/or component power or control buttons, and/or ports of the component. The component securing unit can, in some implementations, mitigate against multiple types of removal attracts, including for example prying attacks, wire sawing attacks and chemical solvent attacks. The component securing unit can, in some implementations, be configured to be installed on and removed from the component with little or no residual damage or marking to the component. The component securing unit is configured to be used with many different types and sizes of components without modification to or adjustment of the component securing unit. By way of non-limiting example, the component that is being secured can be any mobile or interactive electronic or non-electronic component that is at risk of unauthorized removal from a location, such as a tablet or laptop computer, a smart phone, bottled perfume, electrical tool, a watch, a fitness tracker, a keyboard, a computer component, a camera, a drone, a tool box, a handbag, and the like.

Figure 1:
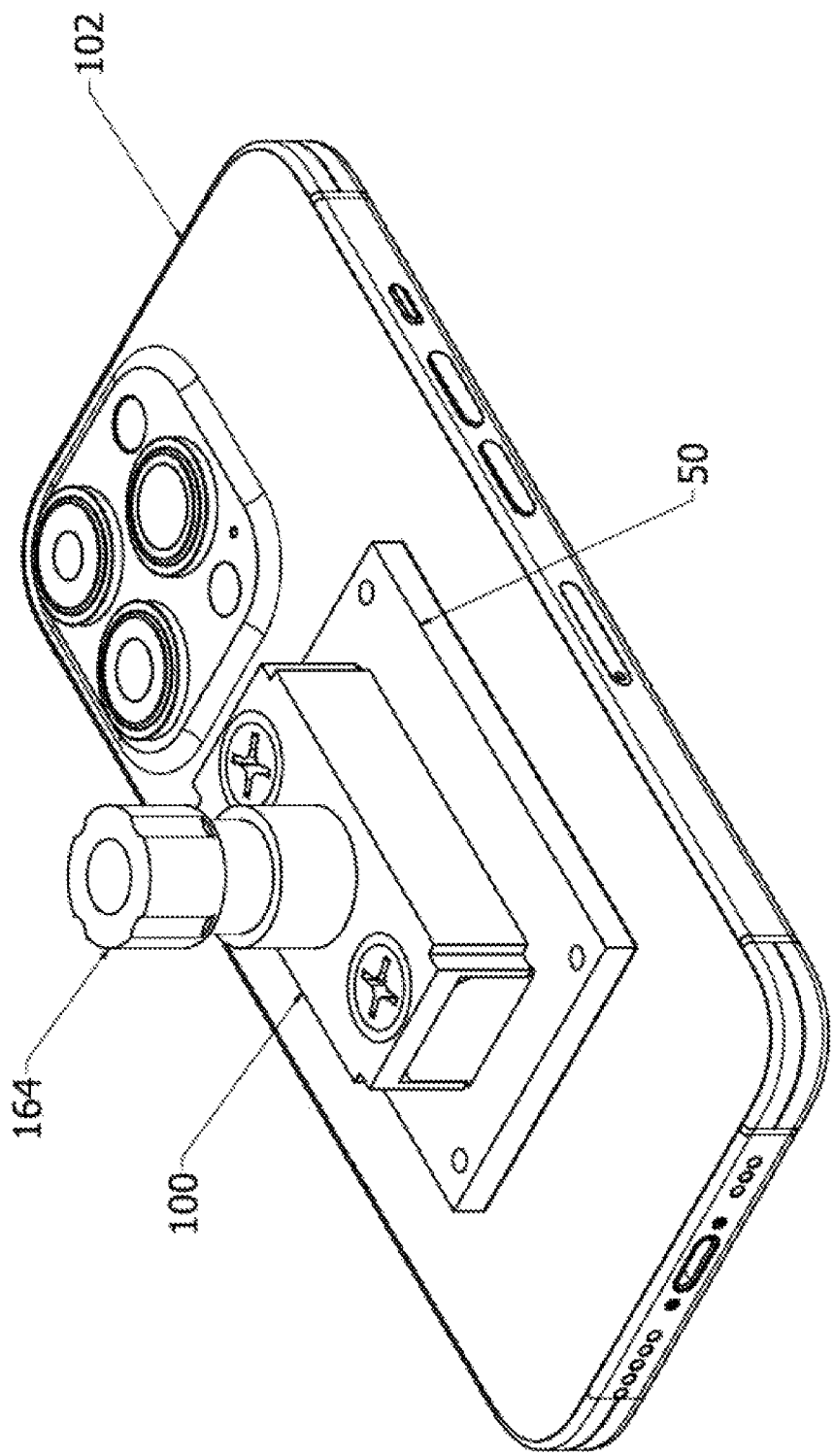
FIG. 1 shows a back perspective view of a component securing unit of an anti-theft device, mounted to a component that is to be secured, according to an example embodiment of the present disclosure.

FIG. 1 shows a top perspective view of a component securing unit 100 of an anti-theft device according to an example embodiment of the present disclosure. In FIG. 1, the securing unit 100 is mounted to a cooperating surface region of a mobile component 102. In the illustrated examples, mobile component 102 is illustrated as a smart phone although, as noted above, the mobile component could be any component that needs to be secured. FIG. 2 is a bottom view of the component securing unit 100, FIG. 3 is an end view of the component securing unit 100, and FIG. 4A is a sectional side view taken along the line F-F of FIG. 3. The component securing unit 100 is a rigid structure and includes a component interface 50 for mounting the component securing unit 100 to the cooperating surface region of mobile component 102, and an anchor interface 164 for securing the component securing unit 100 to an anchoring structure. The component interface 50 defines a first interface surface region 52 (e.g., a central surface region) and a second interface surface region 54 (e.g., a peripheral surface region). In the illustrated example, as best illustrated in the bottom plan view of FIG. 2, second interface surface region 54 extends around a perimeter of the first interface surface region 52, thereby surrounding a periphery of the first interface surface region 52.

In the illustrated example, second interface surface region 54 and first interface surface region 52 are each planar surfaces and are parallel to each other. A first adhesive material 16 is located on the first interface surface region 52 and a second adhesive material 18 is located on the second interface surface region 54.

The component interface 50, first adhesive material 16, and second adhesive material 18 are co-operatively configured such that the first adhesive material 16 and second adhesive material 18 can each adhere to respective portions of the cooperating surface region of mobile component 102 to mount the component securing unit 100 to the mobile component 102. When the component interface 50 is mounted to the mobile component 102, the second adhesive material 18 surrounds a periphery of the first adhesive material 16 such that the second adhesive material 18 can, together with the component interface 50, provide a protective barrier for the first adhesive material 16. The protective barrier can for example protect the first adhesive material 16 from chemical attacks (for example from an acrylic defeating solvent) solvent, and from physical attacks (for example against a saw wire attack parallel to the cooperating surface of the mobile component 102, or a prying attack).

In example embodiments, the first adhesive material 16 and the second adhesive material 18 each have a respective set of adhesive material properties. By way of example, FIG. 5 illustrate end views of first adhesive material 16 and second adhesive material 18, respectively, as respective double sided tape structures. The first adhesive material 16 includes a central carrier 56 that supports an adhesive 58 on opposite sides thereof. The second adhesive material 16 includes a central carrier 60 that supports an adhesive 62 on opposite sides thereof. Prior to use, a removable liner (not shown) can be located on the outer surfaces of adhesives 58, 62.

In example embodiments, the adhesive 58 and the adhesive 62 have different physical and/or chemical properties, the carrier 56 and carrier 60 have different physical and/or chemical properties, and the first adhesive material 16 has a thickness profile $TP_a$ that is larger than a thickness profile $TP_b$ of the second adhesive material 18. By way of non-limiting example, in an example implementation: (i) the first adhesive material 16 includes a double sided acrylic foam carrier 56 with an acrylic adhesive 58 located on both sides thereof, and the second adhesive material 18 includes a double sided polyethylene terephthalate (PET) carrier 60 with a rubber based adhesive 62 located on both sides thereof; (ii) the first adhesive material 16 can have a thickness profile TP of greater than 30 mils (i.e., 0.03 inches) and second adhesive material 18 can have a thickness profile TP of less than 10 mils (i.e., 0.01 inches); and (iii) the first adhesive material 16 has a greater compressibility than the second adhesive material 18. In one or more examples, the first adhesive material 16 can be more porous than the second adhesive material 18. In some implementations, the higher compressibility of the first adhesive material 16 can enable it to better adhere to a rougher cooperating surface than the second adhesive material 18, whereas the less porous structure of second adhesive material 18 can make it less absorbent of (and thus less susceptible to damage by) chemical liquids. In another example, the first adhesive material 16 can have a thickness profile TP of greater than 10 mils and second adhesive material 18 can have a thickness profile TP of less than 8 mils. In another example, the first adhesive material 16 can be a double side tape such as 3M™ VHB mounting tape.

In one or more examples, the first adhesive material 16 can be more resistant to normal tension forces than the second adhesive material 18. In one or more examples, the second adhesive material 18 can be more resistant to shearing forces than the first adhesive material 16.

By way of non-limiting example, in an illustrative implementation the first adhesive material 16 can be DURACO™ HIGH BOND 34 double side tape, and the second adhesive material 18 can be one of DURACO™ DK Film™ LSE or 2.0. In such case, the first adhesive material 16 can have a thickness profile $TP_a$ of 40 mils (i.e., 0.04 inches) and second adhesive material 18 can have a thickness profile $TP_b$ of 6.5 mils (in the case of DURACO™ DK Film™ LSE) or 4.5 mils (in the case of DURACO™ DK Film™ 2.0).

With reference to FIG. 4A, in the case where the first adhesive material 16 has a thicker profile than the second adhesive material 18, the first interface surface region 52 can be set-off rearward from a front of the component interface 50 relative to the second interface surface region 54 to at least partially accommodate the thicker profile. As used herein, the "front" of the component interface 50 refers to the face of the component interface 50 that is facing the component 102 when the component security unit 100 is mounted to the component 102. From the perspective of the component securing unit 100, "forward" refers to a direction that is towards the front of the component interface, and "rearward" refers to a direction that is the opposite of forward.

The set-off (e.g., distance "SO" in FIGS. 4A and 4C) of the first interface surface region 52 relative to the second interface surface region 54 can for example a distance that is no greater than the difference in thickness profiles $TP_a$ and $TP_b$. In some examples, the set-off distance "SO" can be less than the difference in thickness profiles $TP_a$ and $TP_b$ value to account for the higher compressibility of the first adhesive material 16 than the second adhesive material 18. For example, in a case where profile $TP_a$ is 40 mils $TP_b$ is 6.5 mils, set-off distance "SO" can be in the range of 15 mils to 30 mils, depending on the relative compressibility of the first adhesive material 16 than the second adhesive material 18, so long as the two adhesive materials 16 and 18 can each simultaneously adhere to respective portions of the cooperating surface of the mobile component 102.

In the illustrated examples, the first interface surface region 52 is a rectangular, planar surface. The second interface surface region 54 is a planar surface that is parallel to and surrounds the periphery of the first interface surface region 52. A rectangular shaped section of first adhesive material 16 that corresponds to the size and shape of first interface surface region 52 can be secured to the first interface surface region 52 by removing a tape liner from the adhesive 58 one side of the first adhesive material 16 and pressing the exposed adhesive onto the first interface surface region 52. Similarly, a rectangular-with-a rectangular-opening-shaped second adhesive material 18 that corresponds to the size and shape of second interface surface region 54 can be secured to the second interface surface region 54 by removing a tape liner from the adhesive 62 one side of the second adhesive material 18 and pressing the exposed adhesive onto the second interface surface region 54.

In example implementations, the mobile component 102 can only accommodate up to a maximum shear force or maximum normal tension force being applied between the component securing unit 100 and the mobile component 102 without causing permanent damage to the mobile component 102. Thus, in example embodiments, the component interface 50, first adhesive material 16, and second adhesive material 18 are co-operatively configured such that when the component securing unit 100 is mounted to the mobile component 102, application of either a normal tension force that is beyond the maximum normal tension force or application of a shearing force that is beyond the maximum shearing force are required to overcome the adhesive bond securing the component securing unit 100 to the mobile component 102. Thus, an unauthorized brute-force attack to attempt removal of the component securing unit 100 from the mobile component will render the mobile component 102 useless for its intended task, thereby providing a deterrent against such a brute force attack.

In at least some example implementations, the first peripheral interface surface region 54 has a surface area that is large enough to allow a sufficient amount of first adhesive material 16 for securing engaging the mobile component 102. In a first non-limiting example, the one first peripheral interface surface region 54 has a surface area of 2.5 square inches or greater for receiving first adhesive material 16 of a similar surface area. In one example, the first peripheral interface surface region 54 has a dimension of 1.6 inches by 2.5 inches, and a surface area of 4 square inches. In other non-limiting example embodiments, surface region 54 has a surface area of between 3 square inches 8 square inches. In at least some non-limiting example implementations, the second peripheral interface surface region extends at least ¼ inches from an inner edge to outer edge thereof, such that a minimum of ¼ inch of second adhesive 18 surrounds the perimeter of the outer edge of the first adhesive 16 when mounted to mobile component 102.

In at least some example embodiments, in order to facilitate removal of the component securing unit 100 from the mobile component 102, the component securing unit 100 is made up of a set of discrete counterparts that can be cooperatively locked together for mounting the component securing unit 100 to mobile component 102, and subsequently unlocked to facilitate removal of the component securing unit 100 without causing damage to the mobile component 102.

Figure 6:
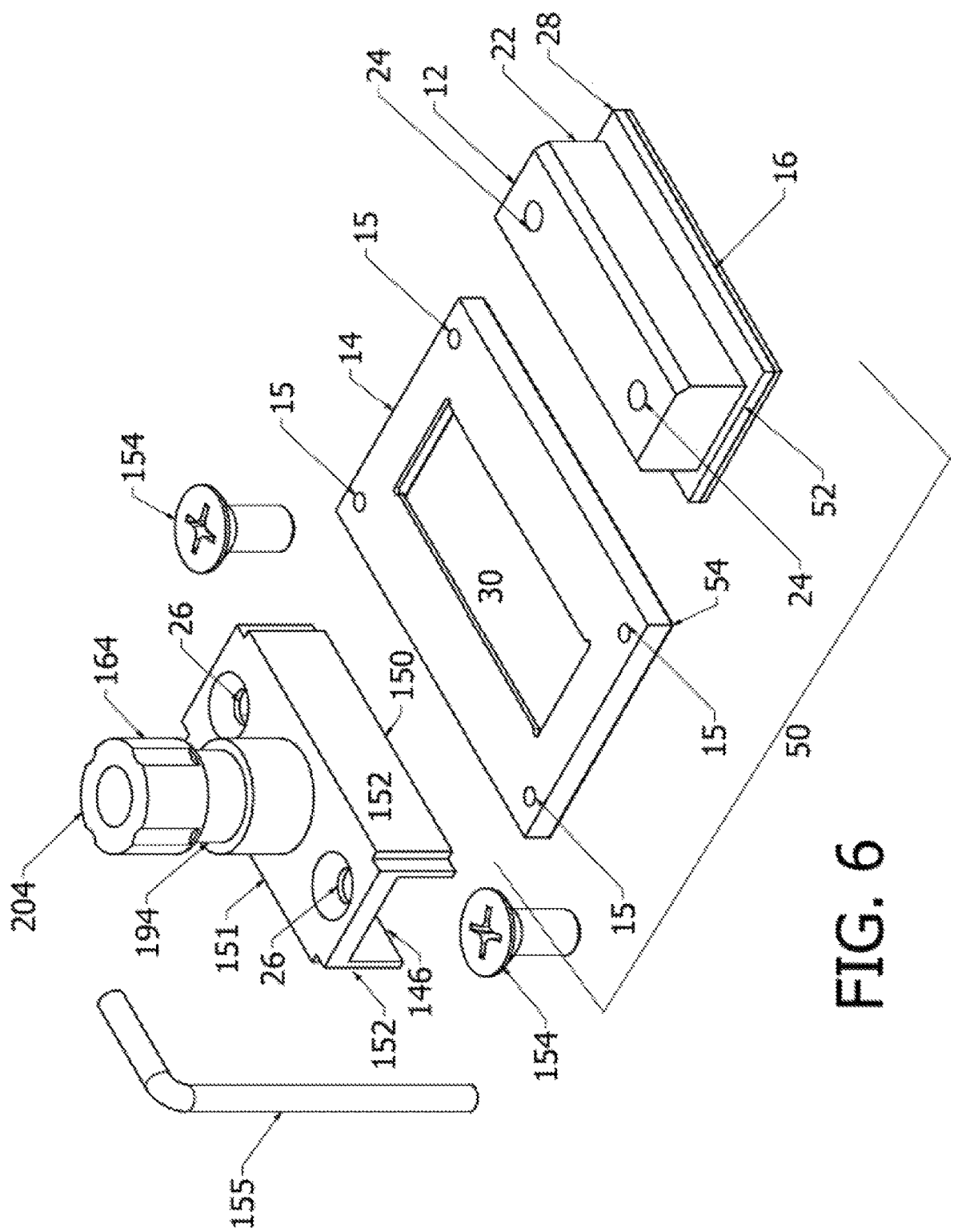
FIG. 6 is a perspective view of unassembled counterparts of a component securing unit of an anti-theft device according to an example implementation.
Figure 7:
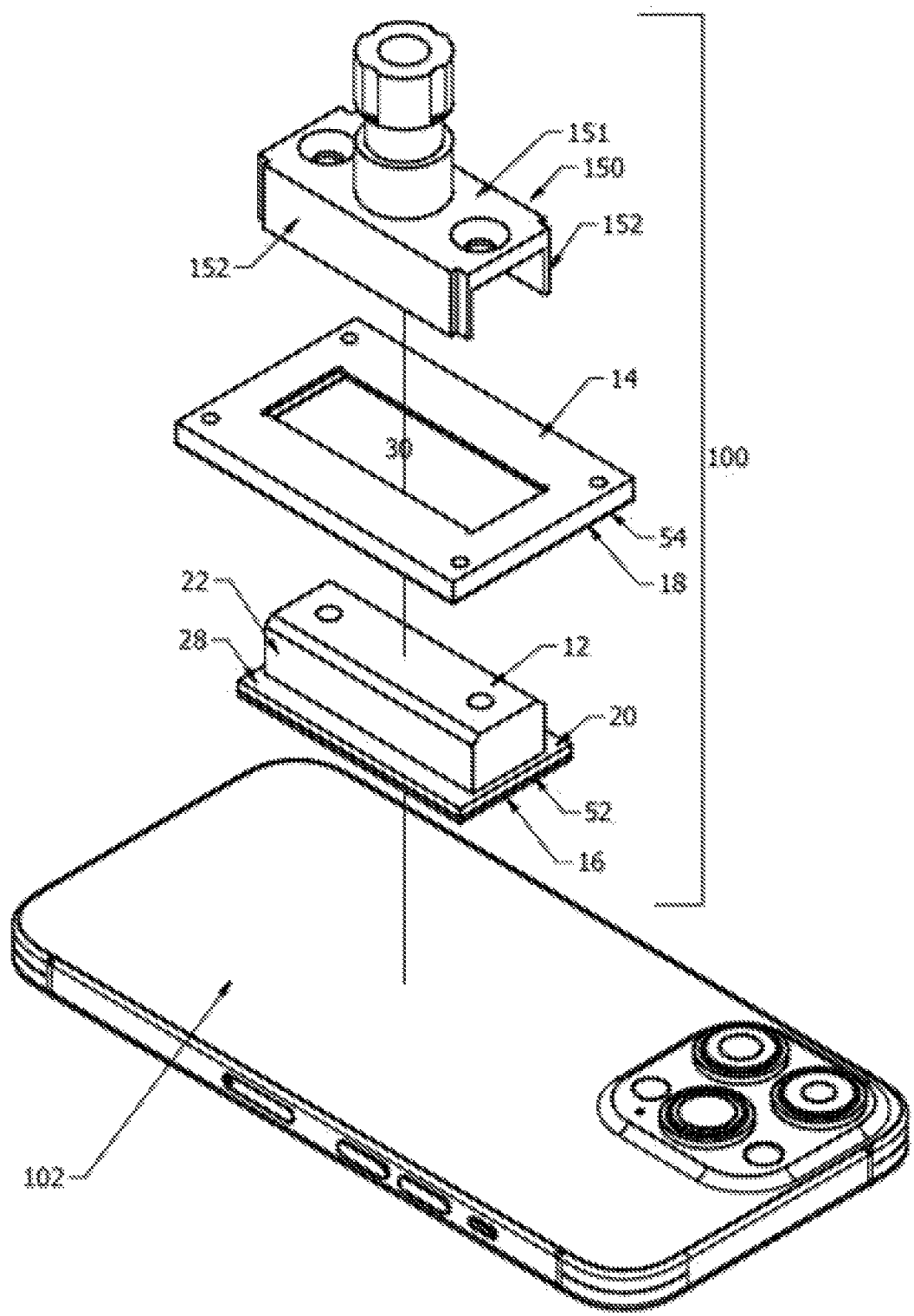
FIG. 7 is a perspective exploded view of components of the component securing unit of FIG. 6, together with a mobile component.

In this regard, FIG. 6 shows a perspective view of the discrete counterparts of component securing unit 100 according to an example embodiment of the present disclosure. FIG. 7 is a perspective exploded view of counterparts of the component securing unit 100 of FIG. 6 in combination with the mobile component 102.

As noted above, component securing unit 100 is configured to be mounted to a planar surface region of the mobile component 102 using two different types of adhesive materials 16, 18, each of which have different adhesive properties. In the illustrated example, the component interface 50 includes a first counterpart 12 that defines the first interface surface region 52 on which the first adhesive 16 is located, and a cooperating second counterpart 14 that defines the second interface surface region 54 on which the second adhesive 18 is located. Component securing unit 100 further includes a third counterpart (also referred to as the "base counterpart") 150 that can be releasably coupled to first counterpart 12 and second counterpart 14 using a locking mechanism. In the illustrated example, the locking mechanism includes one or more screw-type fasteners 154 that can be extended through holes 26 located in the base counterpart 150 and be screwed into corresponding threaded holes 24 that are provided on a back surface of the first counterpart 12. In example implementations, the heads of screw-type fasteners 154 are keyed such that a specially keyed screw driver tool 155 is required to tighten and remove the screw-type fasteners 154.

The counterparts 12, 14, 150 and locking mechanism of component securing unit 100 can take a number of different cooperating configurations in addition to the configurations that are described in this disclosure. The described configurations are representative and not exhaustive. In the illustrated example, the discrete counterparts 12, 14, 150 and fasteners 154 can be respectively formed from rigid and durable materials, for example materials that can include, but are not limited to: a durable metal such as aluminum; a metal alloy such as steel, stainless steel, or aluminum alloy; or a graphite alloy; or a plastic resin.

Referring to FIGS. 6, 7, and 8 the first counterpart 12 includes an enlarged rectangular prism shaped first section 20 that defines the first interface surface region 52 that supports the first adhesive 16. A rectangular prism shaped second section 22 extends rigidly rearward from an area of the rectangular prism shaped first section 20, such that the first section 20 provides backward facing surfaces 28 on at least two sides of the rearward extending second section 22. The threaded holes 24 can be provided on a back surface of the rearward extending second section 22. FIG. 9 shows a front perspective view of the first counterpart 12 with the first adhesive material 16 in the process of being applied to the central interface surface region 54.

Referring to FIGS. 6 and 7, the second counterpart 14 has a rectangular-frame shape that defines a central opening 30 that is configured to receive the rearward extending section 22 of the first counterpart 12. A forward face of the second counterpart 14 defines the second interface surface region 54 that supports the second adhesive 18. FIG. 11 shows a front perspective view of the second counterpart 14 with the second adhesive 18 in the process of being applied to the second interface surface region 54. FIG. 12 is a sectional view taken along the lines XII-XII of FIG. 11. As can be seed in FIG. 12, the area of opening 30 is smaller at a back of the second counterpart 14 relative to the front of the counterpart. In this regard, the second counterpart 14 defines forward facing surfaces 32 along at least two walls of the opening 30. As will be described in further detail below, the backward facing surfaces 28 of the first counterpart 12 and the forward facing surfaces 32 of the second counterpart 14 are co-operatively configured such that the forward facing surfaces 32 face the backward facing surfaces 28 to act against removal of the first counterpart 12 independently of the second counterpart 14 when the component securing unit 100 is mounted to the mobile component 102.

Referring again to FIGS. 6 and 7, in the illustrated example, the base counterpart 150 includes a base wall 151 that is flanked by a pair of forward extending sidewalls 152. Base wall 151 and sidewalls 152 collectively define a forward opening region 146 that is configured to snugly slide over and receive the rearward extending second section 22 of the first counterpart 12. Through holes 26 for receiving fasteners 154 are provided through the base wall 151 that can align with the threaded holes 24 provided on the back surface of the rearward extending second section 22. The base counterpart 150 also includes rearward protruding anchor interface 164 for securing to an anchoring structure.

A description of mounting the component securing unit 100 to a cooperating surface of the mobile component 102 will now be described with reference to FIGS. 8 to 15.

FIG. 8 is a back perspective view of a first counterpart 12 and FIG. 9 is a front perspective view of the first counterpart 12. In the case of a double-sided tape adhesive, the first adhesive material 16 can be applied to the first interface surface region 52 by removing a liner from the adhesive 58 located on one side of the carrier 56 and then pressing the exposed adhesive 58 against the first interface surface region 52. A liner covering the forward facing adhesive 58 on the other side of the carrier 56 can then be removed and used to mount the first counterpart 12 to cooperating surface 103 of the mobile component 102, as shown in FIG. 10. Opposing pressures can be applied to the first counterpart 12 and the mobile component 102 to ensure the first adhesive material 16 securely bonds the first interface surface region 52 of the first counterpart 12 to the cooperating surface 103 of the mobile component 102.

FIG. 11 is a front perspective view of a second counterpart 14 of the component securing unit of FIG. 6, and FIG. 12 is a sectional view of the second counterpart 14, taken along the lines XII-XII of FIG. 11. In the case of a double-sided tape adhesive, the second adhesive material 18 can be applied to the second interface surface region 54 by removing a liner from the adhesive 62 located on one side of the carrier 60 and then pressing the exposed adhesive 62 against the second interface surface region 54. A liner covering the forward facing adhesive 61 on the other side of the carrier 60 can then be removed and the forward facing adhesive 61 used to mount the second counterpart 14 to cooperating surface 103 of the mobile component 102, as shown in FIG. 13. In particular, the second counterpart 14 is placed on the mobile component 102 such that the rearwardy extending section 22 of the first counterpart 12 extends through the central opening 30 of the second the counterpart 14. Opposing pressures can be applied to the second counterpart 14 and the mobile component 102 to ensure the second adhesive material 18 securely bonds the second interface surface region 54 of the second counterpart 14 to the cooperating surface 103 of the mobile component 102.

Figure 14:
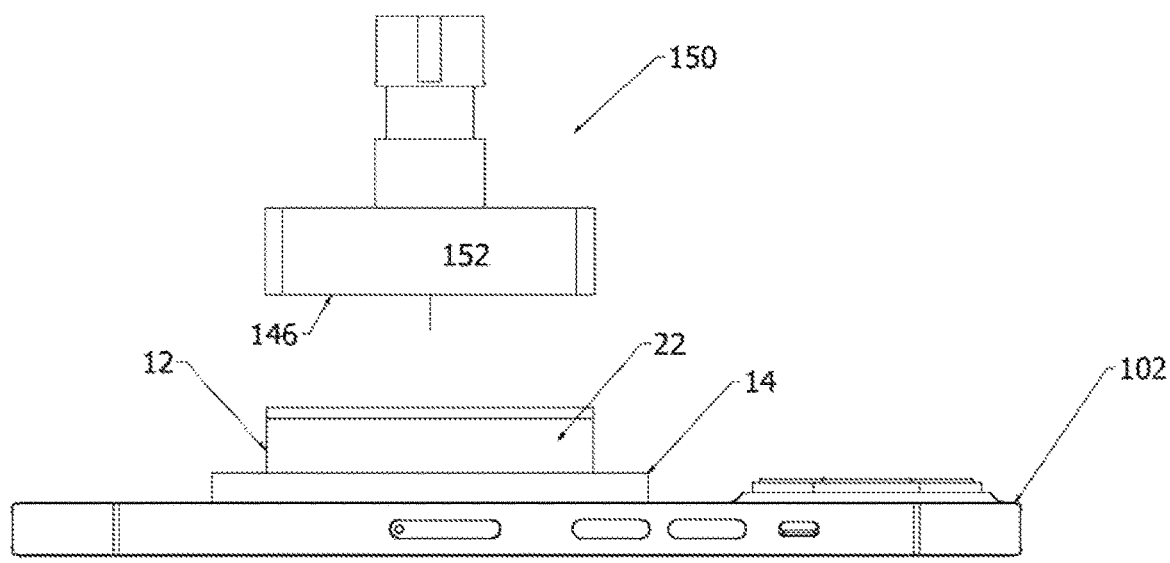
FIG. 14 is a side view of an base counterpart of the component securing unit being secured to the mobile component.
Figure 15:
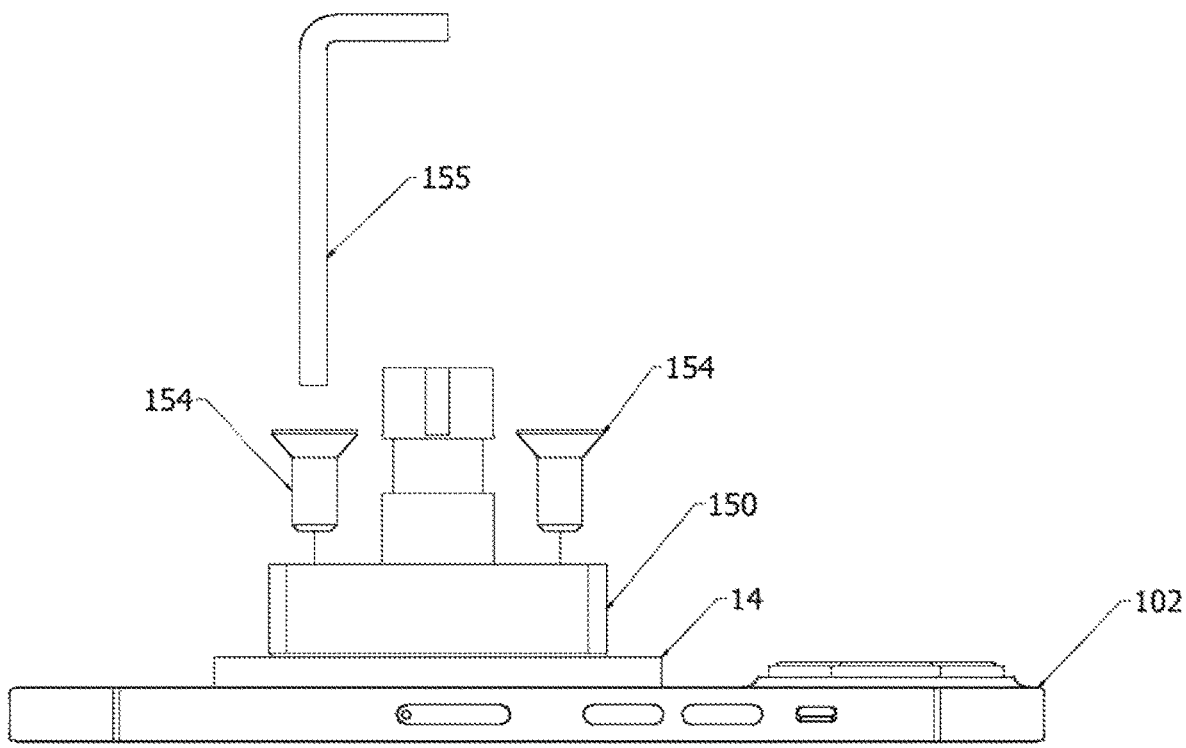
FIG. 15 is a further side view of the base counterpart of FIG. 17 being secured to the mobile component.

As shown in FIG. 14, base counterpart 150 can then be positioned behind the mounted first and second counterparts 12, 14, and moved towards the mobile component 102 until the forward opening region 146 slides over and receives the rearward extending second section 22 of the first counterpart 12 with the holes 26 in the base counterpart 150 in alignment with the threaded holes 24 of the first counterpart 12. As illustrated in FIG. 15, a tool 144 (which can be a specially keyed screw driver tool in some examples) can then be used to secure screw-type fasteners 154 through the holes 26 and into the threaded holes 24, placing the component securing unit 120 in a locked state in which the first, second and base components 12, 14 and 150 are interlocked together to prevent independent removal of any of the counterparts from the cooperating surface of the mobile component 102.

Figure 16:
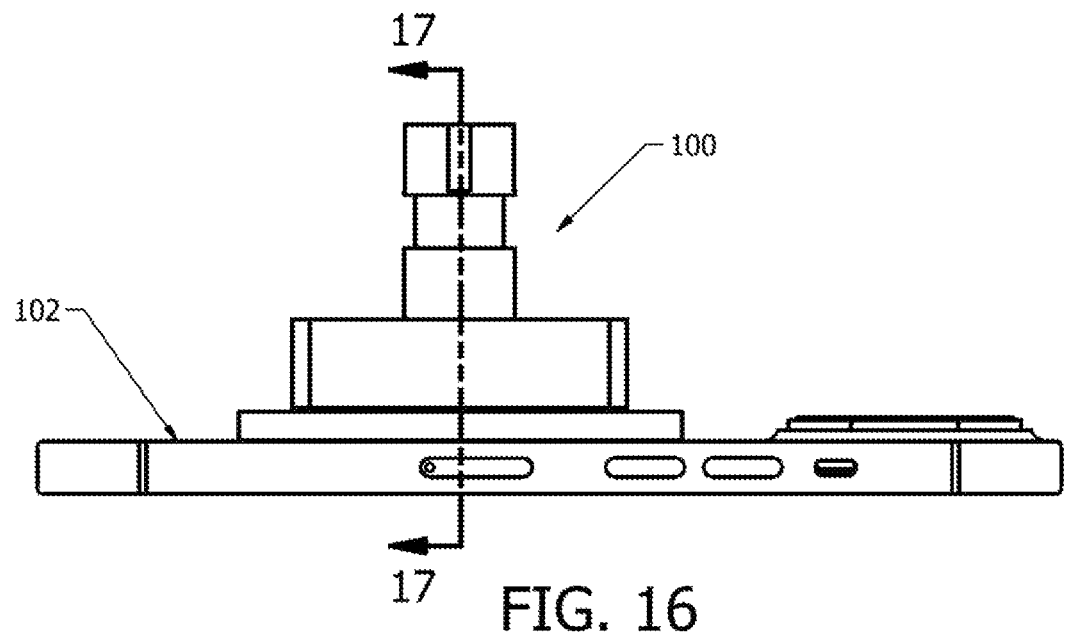
FIG. 16 is a side view of the component securing unit secured to a mobile component.
Figure 17:
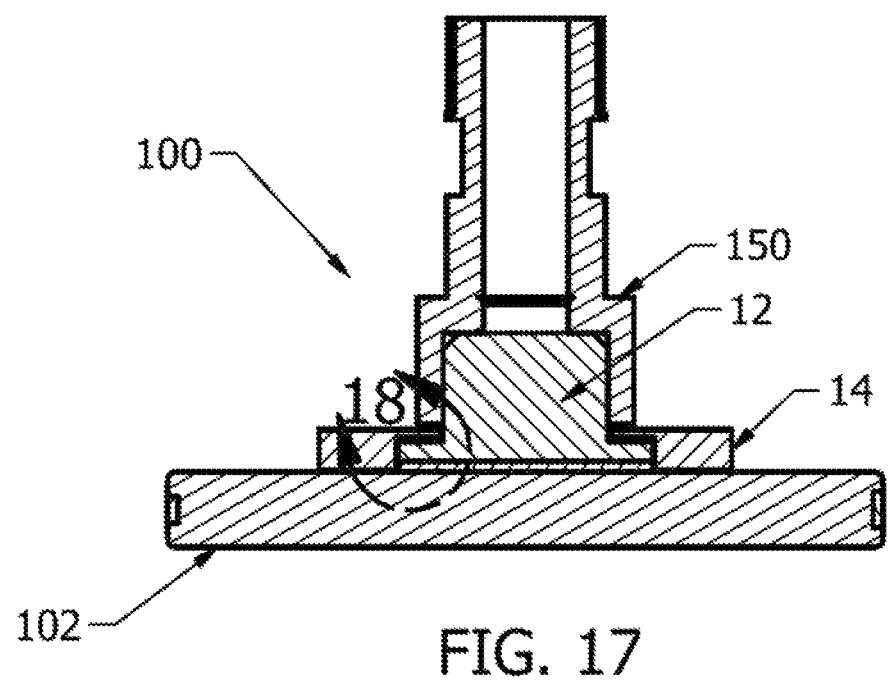
FIG. 17 is a sectional view taken along the lines XVII-XVII of FIG. 16, showing how the counterparts of the component securing unit co-operatively engage each other to lock the component securing unit to the mobile component.
Figure 18:
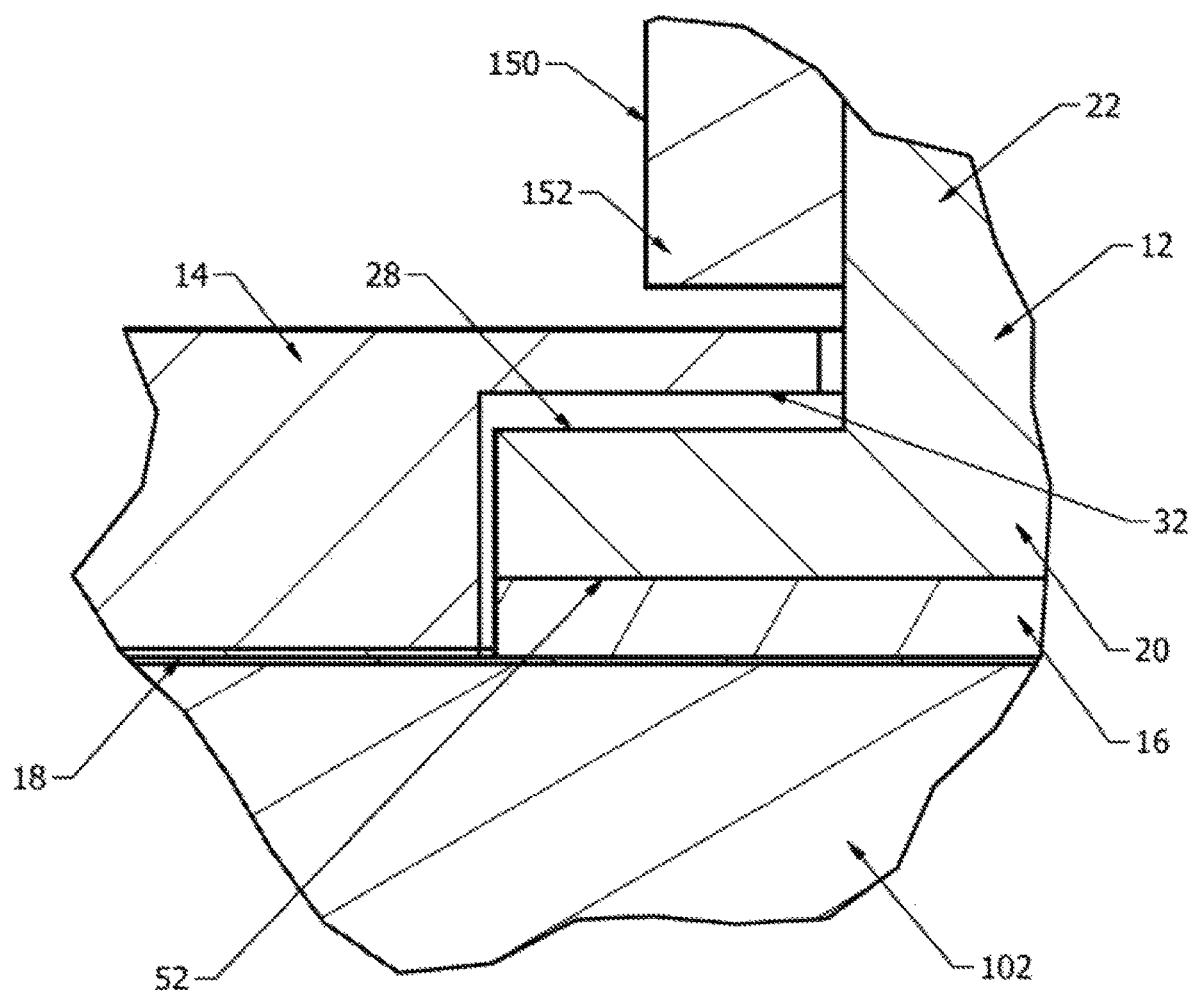
FIG. 18 is an enlarged section view of the portion XVIII of FIG. 17, shown the interaction of counterparts in greater detail.

FIG. 16 is a side view of the component securing unit 100 secured to the mobile component 102. FIG. 17 is a sectional view taken along the lines XVII-XVII of FIG. 16, showing how the counterparts 12, 14 and 150 co-operatively engage each other to lock the component securing unit 100 to the mobile component 102. FIG. 18 is an enlarged section view of the portion XVIII of FIG. 17, shown the interaction of counterparts 12, 14 and 150 in greater detail. As best seen in FIG. 18, when the component securing unit 120 in its locked state while mounted to the mobile component 102, rearward movement of first counterpart 12 is blocked by forward facing surface 32 of the second counterpart 14, which is located rearward of the rearward facing surface 28 of the first counterpart 12. Lateral movement of first counterpart 12 is blocked by the inner walls of opening 30. Furthermore, rearward movement of second counterpart 14 is blocked by sidewalls 152 of the base counterpart 150, which are positioned behind portions of the second counterpart 14. Movement of the base counterpart 150 relative to the first counterpart 12 is prevented by the interaction of sidewalls 152 with the rearward extending second section 22 of the first counterpart 12 and the compressive force of fasteners 154.

Figure 19:
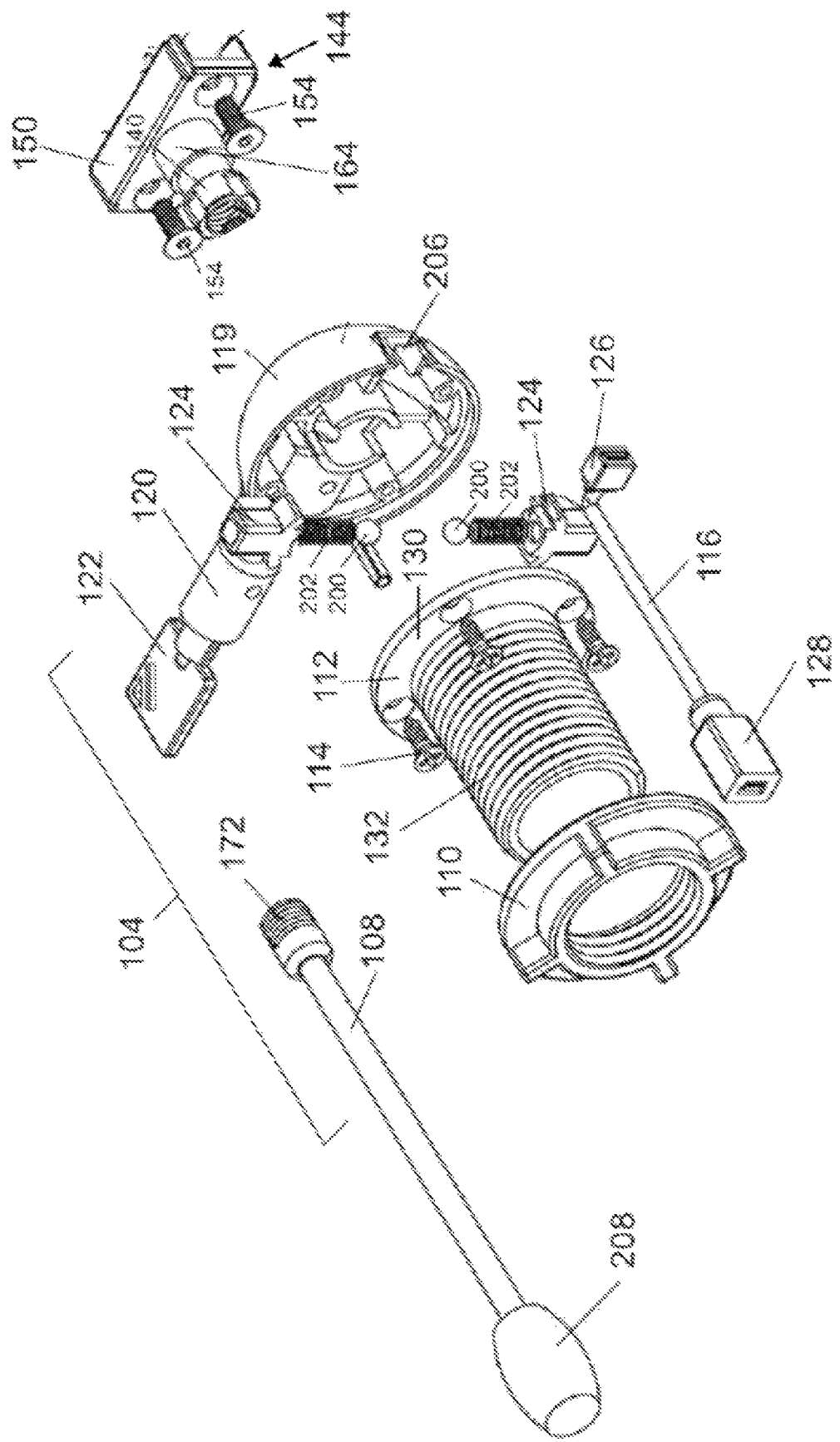
FIG. 19 is an exploded perspective view of the base counterpart of FIG. 17 in combination with an anchor unit of the anti-theft device.

As noted above, in example implementations the base counterpart 150 includes an anchor interface 164 for securing the component securing unit 100 to an anchoring structure. By way of example, as shown in FIG. 19, the component securing unit 100 can be one part of an anti-theft device that includes an anchor assembly 104 that is configured to cooperate with the anchor interface 164 to secure the component securing unit 100 to an anchoring structure. In this regard, anchor assembly 104 can be configured to be secured to a stationary support such as a display counter. In some embodiments, a tether 108 may be used to movably secure the component securing unit 100 to the anchor assembly 104.

As best seen in FIG. 19, in one example implementation, the anchor assembly 104 includes a cylindrical anchor member 112 that has a radial flange 130 at a forward end and from which a threaded tube 132 extends in a rearward direction. In use, the threaded tube 132 passes through a circular opening in a support member (such as a display counter), with the radial flange 112 resting on a surface of the support member. A threaded anchor plate or ring nut 110 can be screwed onto threaded tube 132 to engage the opposite surface of the support member to secure the cylindrical anchor member 112 in place. In at least one example embodiment, the anchor assembly 104 includes an anchor lock assembly 118 that releasably locks the mount assembly 106 to the anchor assembly 104. The anchor lock assembly 118 includes a rigid lock housing 119 that houses a lock device 120 that is actuated by a key 122 in the illustrated example.

In the illustrated embodiment, the anchor interface 164 of base counterpart 150 is cylindrical and includes internal threads at its rearwardly extending end 190 for receiving a threaded end 172 of the tether 108. Anchor interface 164 is configured to be releasably received within a central, cylindrical opening 192 that is provided through the lock housing 119 of anchor lock assembly 118. In this regard, the anchor interface 164 defines a radial channel 194 located forward of enlarged end 190. When the anchor interface 164 is fully inserted into anchor lock assembly 118, the radial channel 194 aligns with a radial opening 196 that extends from cylindrical opening 192. Lock device 120 can include a retractable lock pin which extends into the radial channel 194 of anchor interface 164 when in an extended, locked position. Thus, when in the locked position, the extending end of lock pin 198 will engage the enlarged anchor interface end 190 to prevent the component securing unit 100 from being removed from the anchor lock assembly 118. Key 122 can be used to retract lock pin 198 from the radial channel 194 of anchor interface 164 to release the component securing unit 100 so it can be removed from the anchor lock assembly 118. In some embodiments, the lock pin 198 is chamfered and spring loaded into the extended position to allow the anchor interface 164 to be inserted and snapped into a locked position in the central opening 192 without requiring actuation of key 122, while withdrawal of the anchor interface 164 is prevented until key 122 is actuated to retract the lock pin 198.

In the illustrated embodiment the radial channel 194 allows the component securing unit 100 to rotate even when the lock pin 198 prevents its removal from the anchor lock assembly 118. In some example embodiments, the anchor lock assembly 118 includes an indexing mechanism for controlling rotation of the component securing unit 100. For example, anchor lock assembly 118 can include a pair of opposed spring loaded balls 200 that extend partially into central opening 192 to engage the enlarged end 190 of the anchor interface 164. Radial index notches 204 are provided on the anchor interface 164 for receiving the spring loaded balls 200, allowing the component securing unit 100 to snap into and out of biased positions as it rotates about the Z axis, with spring loaded balls 200 acting as cam followers and the notched radial outer surface of the enlarged end 190 acting as a cam. Such indexing may be used for example to facilitate rotation of component securing unit 100 ninety degrees between a "landscape" and "portrait" viewing positions for object 102. In one example, the balls 200 are each biased partially into central opening 192 by a respective spring 202 that is held in place within the lock housing 119 by a respective spring retaining member 124. In some example embodiments, one or more stop members 195 are located in radial channel 194 for cooperating with lock pin 198 on the anchor interface 164 in order to prevent the component securing unit 100 from being rotated beyond a threshold amount, thus protecting any power cord attachment to the mounted device. In one example embodiment, stop members 195 are positioned to prevent the mount assembly 104 from being rotated more than 180 degrees. In such an embodiment, the indexing could be used to allow the component securing unit 100 to "click" into a portrait position, be rotated 90 degrees counter-clockwise to "click" into a first landscape position, then be rotated 180 degrees clockwise to "click" into a second landscape position, with the stop members 195 preventing counter-clockwise rotation beyond the first landscape position and clockwise rotation beyond the second landscape position.

In one example, the anchor assembly 104 includes a power/data line 116 that extends internally within the cylindrical anchor member 112 and which has a connector 128 at one end for connecting to a power and/or data source and a further connector 126 at the other end 126 for connecting to a line to mobile component 102. In the illustrated embodiment, lock housing 119 defines an external opening 206 that houses connector 126. Connectors 126, 128 could for example be USB male or female plug style connectors. In at least one example, connector 126 is a female connector rigidly secured in place to the lock housing 119 such that a short power line can be connected from lock housing 119 to the mobile component 102 to periodically charge the mobile component 102 as required.

Tether 108 can optionally be used. In particular, the tether 108 can provide a degree of security when the component securing unit 100 is released from the lock assembly 118. The tether 108 can be used by inserting its threaded end 172 through the central opening of anchor assembly 104, and then screwing the threaded end 172 into the threaded opening that is provided at the back end of anchor interface 164. Enlarged end 208 of the tether 108 then prevents removal of the tether 108 from the anchor assembly 104.

Figure 20C:
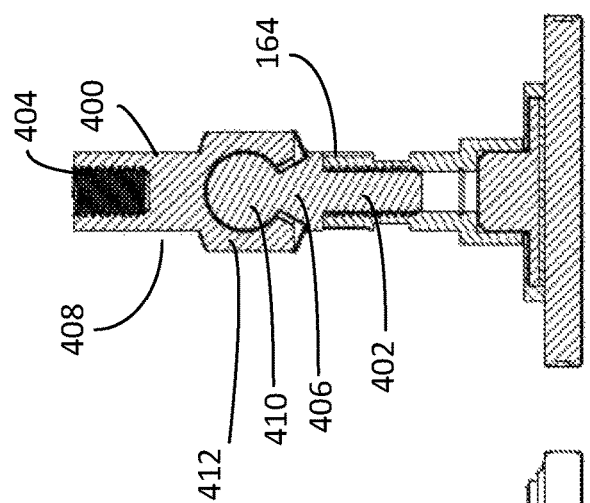
FIG. 20C is a sectional view, taken along the line 20C-20C of FIG. 20B.
Figure 20B:
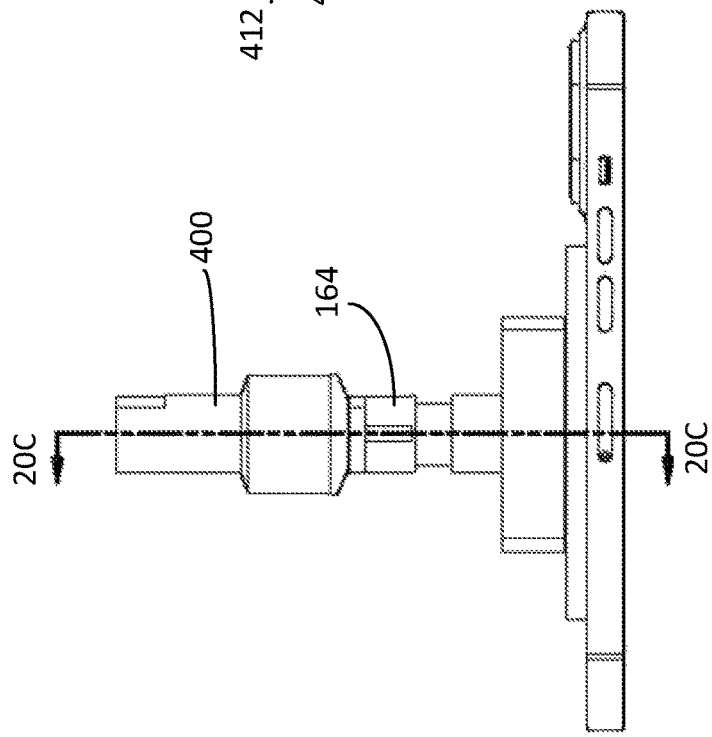
FIG. 20B is a side view showing the mounting interface that may be used with the component securing unit of FIG. 1.
Figure 20A:
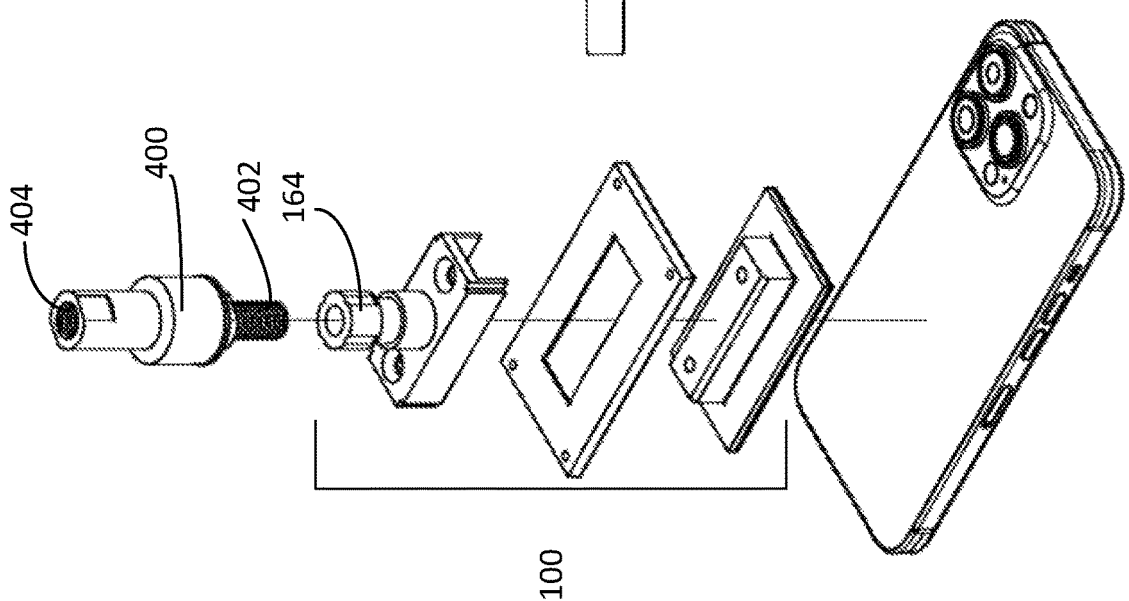
FIG. 20A is an exploded perspective view showing a mounting interface that may be used with the component securing unit of FIG. 1.

In one example embodiment, a universal joint that allows multi-directional swiveling and pivoting of the component securing unit 100 relative to an anchoring device or structure (for example relative to tether 108) can be provided as an integral part of, or as modular part for attachment to, the anchor interface 164 of the component securing unit 100. In this regard, FIGS. 20A, 20B and 20C show examples of a universal joint assembly 400 that can be secured to the back end of anchor interface 164. In particular, FIG. 20A is an exploded perspective view showing a universal joint assembly 400 in combination with the component securing unit 100, FIG. 20B is a side view, and FIG. 20C is a sectional view, taken along the line 20C-20C of FIG. 20B. As shown in these Figures, the illustrated universal joint assembly 400 includes a ball component 406 that includes a protruding ball structure 410 at a back end and a threaded screw portion 402 at an opposite, forward end. Threaded screw portion 402 may for example be secured into the threaded opening at the back end of anchor interface 164. The illustrated universal joint assembly 400 also includes a socket component 408 that includes a socket 412 at a forward end that receives the protruding ball structure 410 of the ball component 406. The socket component 408 can, for example, include a threaded opening 404 at its back end for receiving the threaded end 172 of the tether 108. The ball structure 410 and socket 410 are cooperatively configured to provide a universal joint that will allow multi-directional pivotal movement, and also rotational movement, of the ball component 406 relative to the socket component 408 while, at the same time, preventing physical separation of the ball component 406 from the socket component 408.

An example of a procedure for removing the component securing unit 100 from mobile component 102 will now be described with reference to FIGS. 21 to 28.

Figure 21:
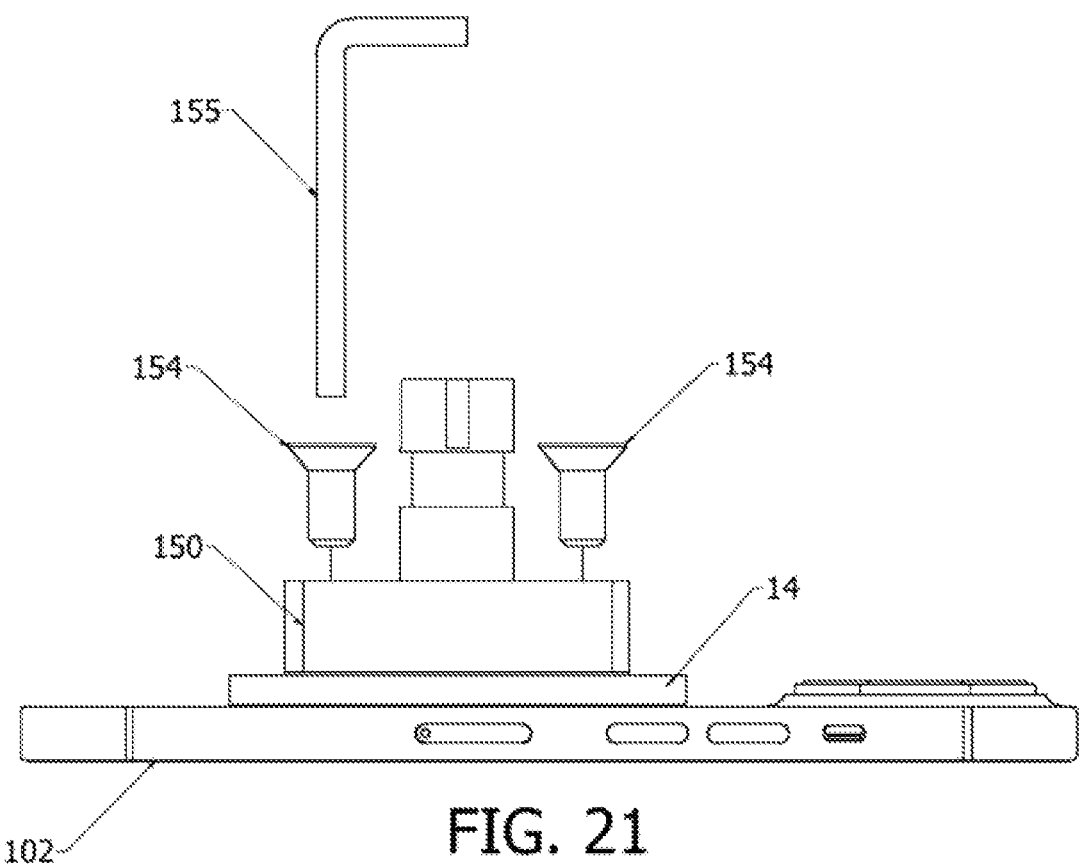
FIG. 21 is a side view of the base counterpart of FIG. 17 being removed from the mobile component.
Figure 22:
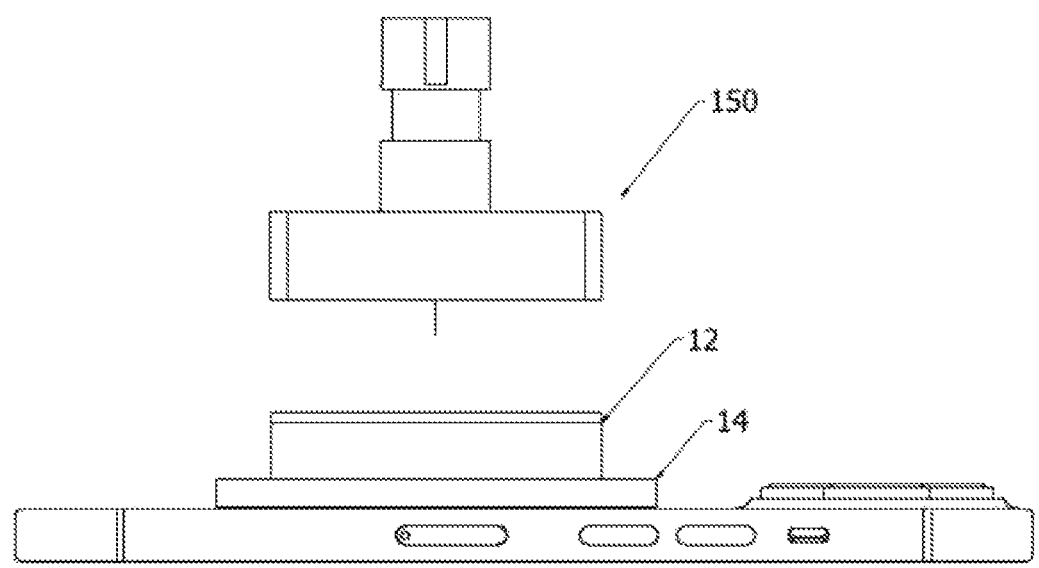
FIG. 22 is a further side view of the base counterpart of FIG. 17 being removed from the mobile component.
Figure 23:
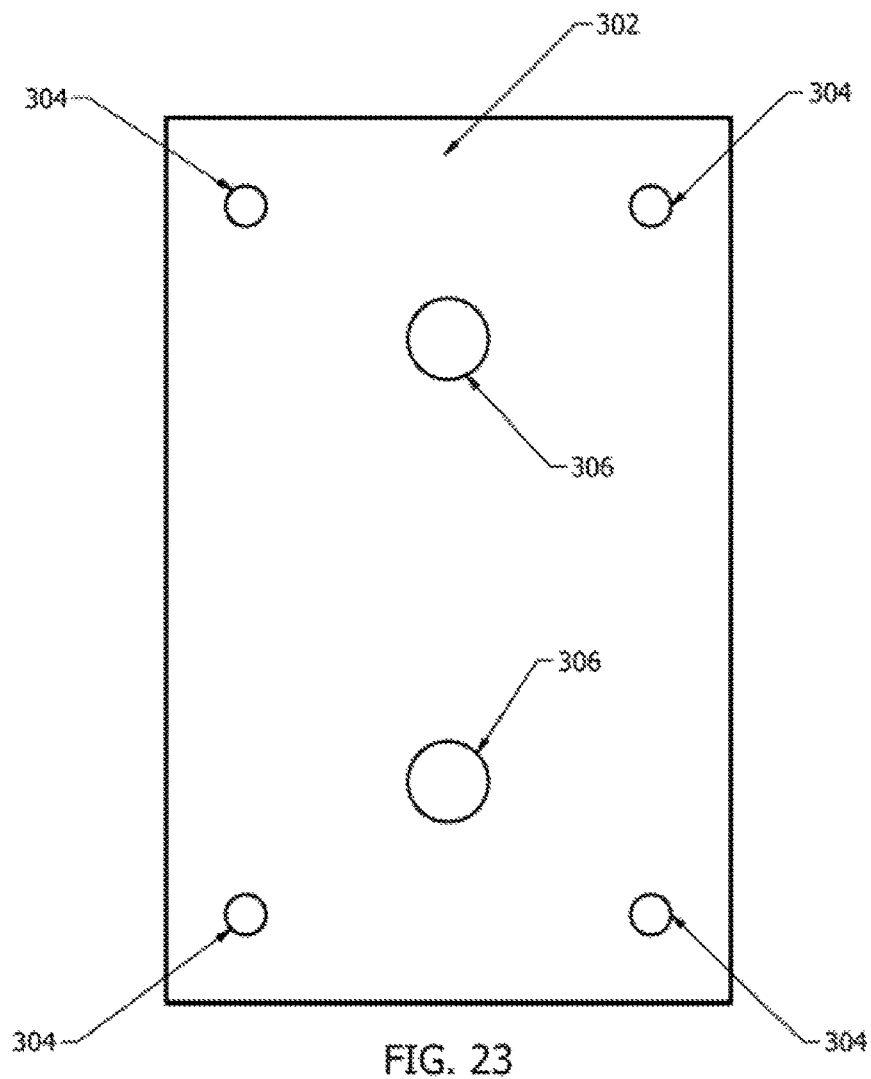
FIG. 23 is a top view of a removal plate used for removing the second counterpart of the component securing unit from the mobile component.
Figure 24:
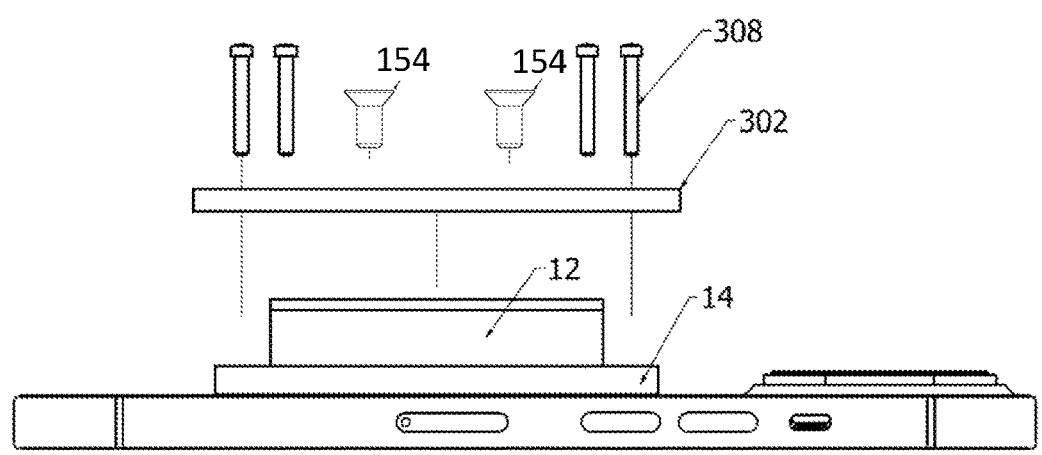
FIG. 24 is side view representing a first stage of applying the removal plate to remove the second counterpart of the component securing unit from the mobile component.

As indicated in FIGS. 21 and 22, base counterpart 150 can be first be removed from first counterpart 12 by using tool 155 to release and remove fasteners 154. With reference to FIG. 23, a removal plate 302 is shown that can then be used for removing the second counterpart 14 of the component securing unit 100 from the mobile component 102. In the illustrated example, planar removal plate 302 includes a first set of through holes 304 that are positioned at its four corners to align with respective threaded holes 15 that are located on second counterpart 14 (see FIG. 6), as well as a pair of further through holes 304 that are configured to align with the threaded holes 24 (see FIG. 6) that are located in the back surface of first counterpart 12. As indicated in FIG. 24, the removal plate 302 is secured to the first counterpart 12 by using fasteners 154 to secure removal plate 302 to first counterpart 12 via through holes 306 and threaded holes 24. When the removal plate 302 is secured to first counterpart 12, the first set of through holes 304 that are positioned at the four corners of the removal plate align with respective threaded holes 15 that are located on second counterpart 14, and the removal plate 302 is supported by the first counterpart 12 spaced apart from the second counterpart 14.

Figure 25A:
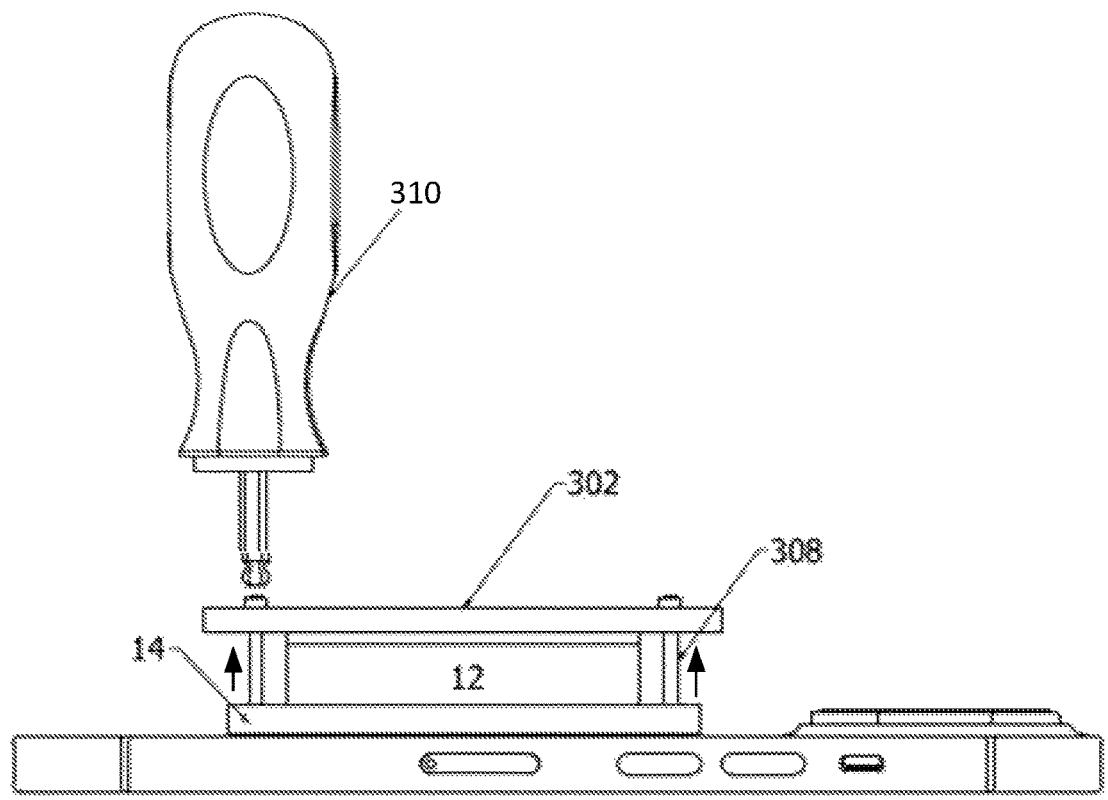
FIG. 25A is a side view representing a second stage of applying the removal plate to remove the second counterpart of the component securing unit from the mobile component.
Figure 25B:
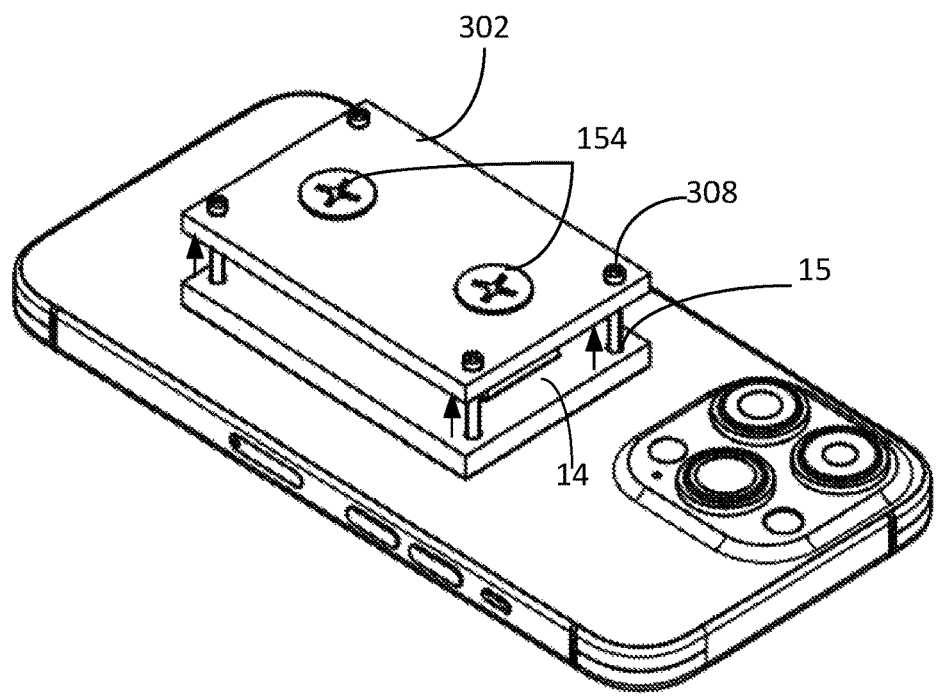
FIG. 25B is a perspective view representing the second stage of applying the removal plate to remove the second counterpart of the component securing unit from the mobile component.

With reference to FIGS. 24 and 25A, 25B, a set of elongated screws 308 can then be extended through the through holes 304 and into the respective threaded holes 15 that are located on the corners of the second counterpart 14. In at least some examples, elongated screws 308 and a cooperating tool 310 used to secure them use a keyed interface such that tool 310 requires a specialized, custom bit end to tighten elongated screws 308. Successive tightening of each of the elongated screws 308 into respective threaded holes 15 provides a normal tension force onto the respective corners of the second counterpart 14, causing the second counterpart 14 to move towards the removal plate 302 (which is supported by first counterpart 12) and disengage from the cooperating surface of the mobile component 102, as illustrated by the arrows in FIGS. 25A and 25B. Thus, the opposing forces provided by the cooperative interaction of removal plate 302 with the first counterpart 12 and the elongated screws 308 on the four corners of the second counterpart 14 is sufficient to overcome the normal adhesive force of the second adhesive 18. The four elongated fasteners 308 allow a removal force applied to the removal plate 302 to be uniformly applied to and distributed across the four corner regions of the second counterpart 14, mitigating against possible damage to either the mobile component 102 or the second counterpart 14.

Figure 26:
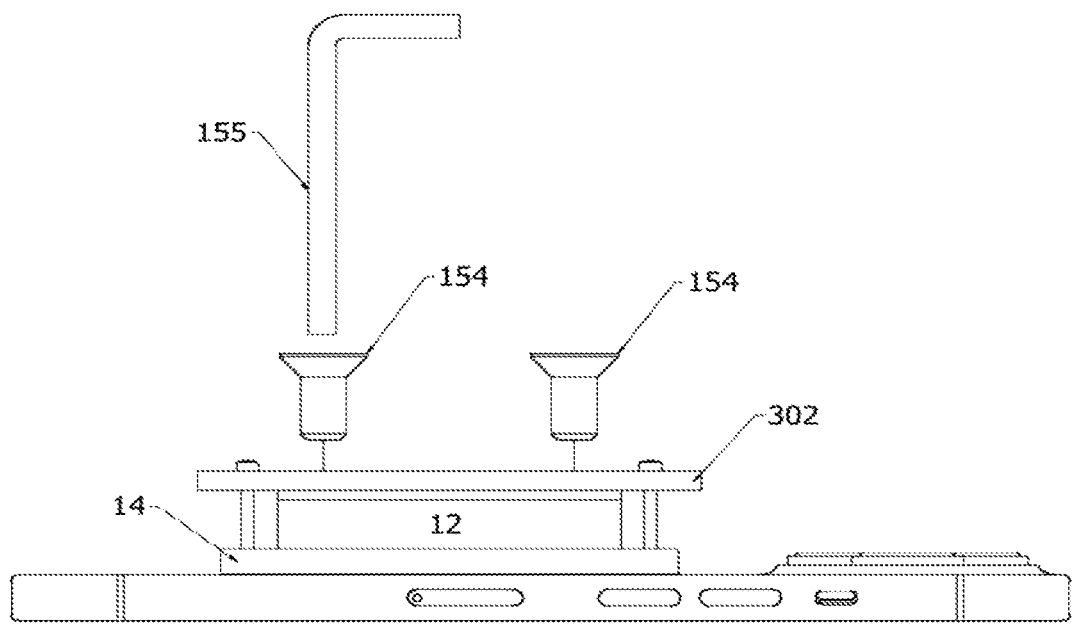
FIG. 26 is a side view representing a third stage of applying the removal plate to remove the second counterpart of the component securing unit from the mobile component.
Figure 27:
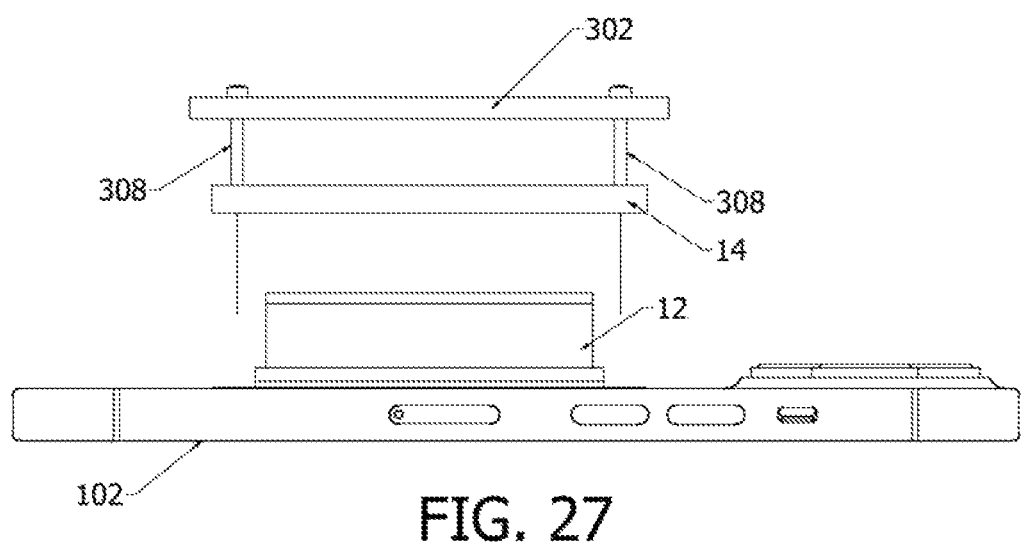
FIG. 27 is a side representing a fourth stage of applying the removal plate to remove the second counterpart of the component securing unit from the mobile component.
Figure 28:
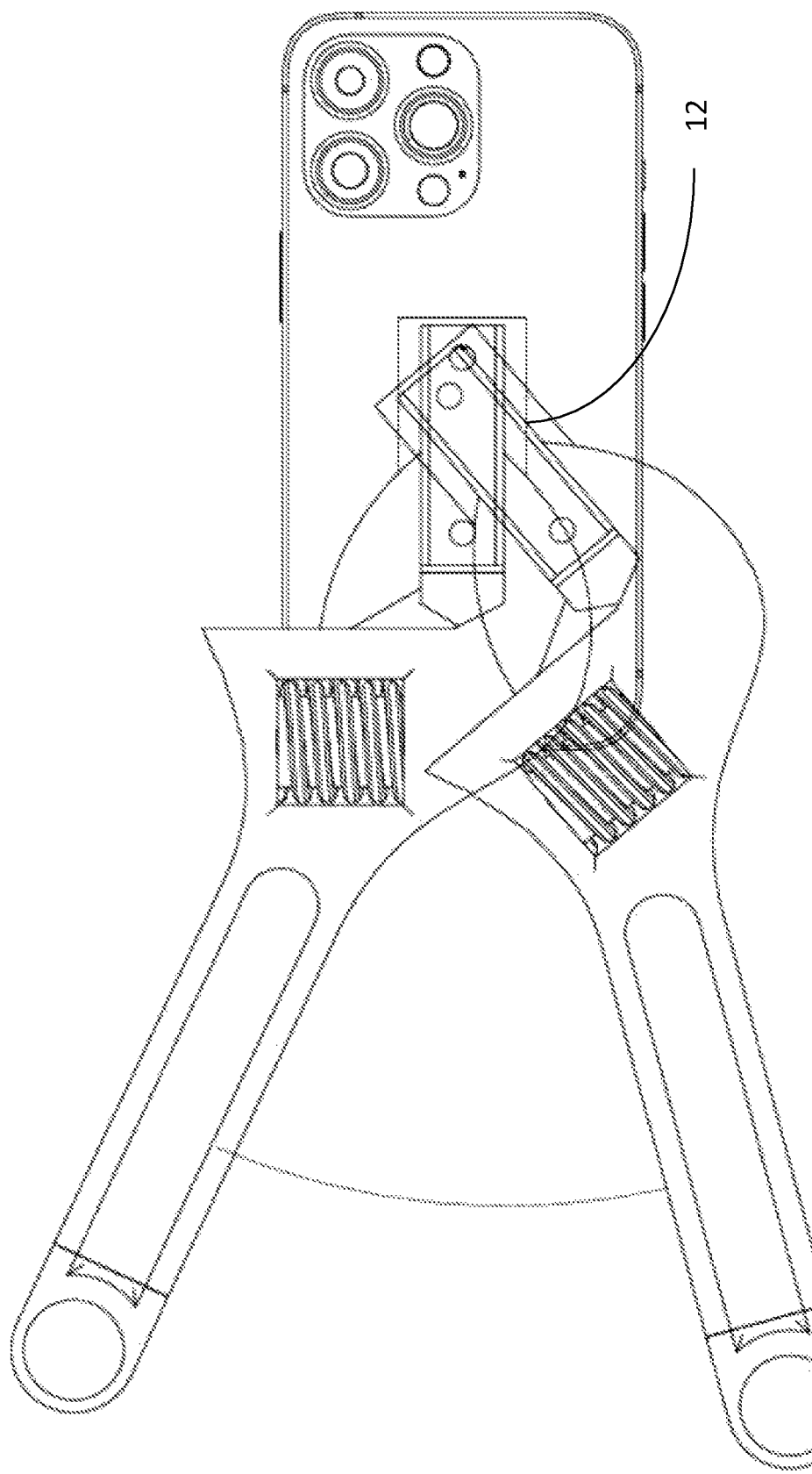
FIG. 28 is a back view of the first counterpart of the component securing unit removed from the mobile component.

As indicated in FIG. 26, the fasteners 154 can then be removed to release the removal plate 302 from first counterpart 12. As indicated in FIG. 27, the removal plate 302 can then be lifted to remove the second counterpart 14 from the mobile component 102. With reference to FIG. 28, a rotating shear force can then be applied to the first counterpart 12 to overcome the shear adhesive force of first adhesive material 16, thereby enabling the first counterpart 12 to be removed, without damage to the mobile component 102 or first component 12, from the mobile component.

As noted above, in example embodiments, the collective adhesive power and surface areas of adhesive materials 16 and 18 are configured such that an attempt to use brute force to remove the component securing unit 100 as an assembled unit from the mobile component 102 will require a degree of force that is likely to damage the mobile component 102. However, the collective adhesive power and surface areas of adhesive materials 16 and 18 are also configured in at least some example embodiments such that in the multi-stage removal process described above, the normal force required to remove the second counterpart 14 on its own and the shear force required to remove the first counterpart 12 on its own from the mobile component 102 are low enough so as to not cause damage to the mobile component 102.

In alternative examples features of removal plate 302 can be integrated into the structure of the first counterpart 12 such that use of a separate removal plate 302 is not required to remove the security mount 100 for mobile device 102. However, use of a separate removal plate 302 can provide extra security in some applications.

Figure 29:
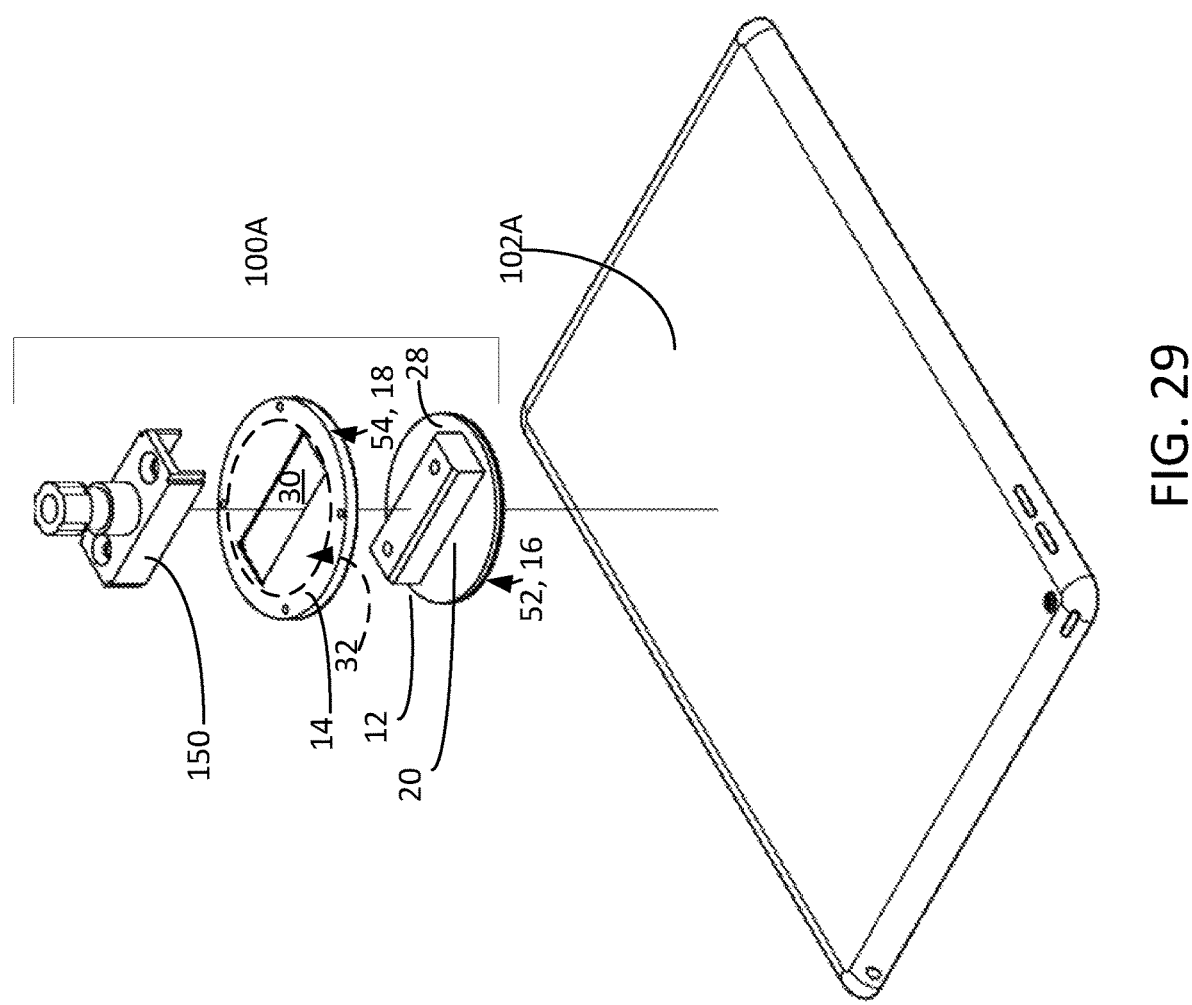
FIG. 29 is a perspective view of a further example configuration of a component securing unit, secured to a further mobile component.

As noted above, the component securing unit 100 can be used, without modification, for securing a variety of sizes and types of mobile components. However, the component securing unit 100 can take a number of physical configurations that apply the features described herein. By way of example, FIG. 29 is a perspective view of a further example configuration of a component securing unit 100A, secured to a further mobile component 102A. The component securing unit 100A is the same as component securing unit 100 described above, with the exception that the first section 20 of the first counterpart 12 is circular, rather than rectangular, and as such defines a circular first interface surface region 52 that supports correspondingly shaped first adhesive material 16. The second counterpart 14 defines an annular second interface surface region 54 that supports a correspondingly shaped second adhesive material 18 for surrounding the periphery of the first interface surface region 52 and first adhesive material 16. The second counterpart 14 also defines forward facing surface 32 about the periphery of opening 30 for contacting backward facing surface 28 of first section 20 of the first counterpart 12.

Although each of component securing unit 100 and 100A as illustrated have first interface surface regions 52 and second interface surface regions 54 that are configured to interface with a planar surface of a mobile component 102, 102A. However, in some examples, the first interface surface region 52 and second interface surface region 54 can be contoured to interact with a corresponding shaped surface of the mobile component that is to be secured. In this regard, FIGS. 30 to 32 show a further example of component securing unit 100B. The component securing unit 100B is the same as component securing unit 100A described above, with the exception that the first interface surface region 52 defined by first counterpart 12 and the second interface surface region 54 defined by second counterpart 14 each have curved surfaces (for example, saddle shaped concave surfaces) that are shaped to conform to a curved surface of a mobile component. As in the above described embodiments, the first interface surface region 52 supports a first adhesive material 16, and the second interface surface region 54 supports a second adhesive material 18 that, when secured to a mobile component, is adjacent to and surrounds a periphery of the first adhesive material 16. FIG. 31 is a side view of the component securing unit 100B of FIG. 30, and FIG. 32 is a sectional view of the component securing unit 100B of FIG. 30, taken along the line 32-32 of FIG. 31.

Accordingly, the features described above can be applied to different shapes and configurations of component security devices for use in various applications.

Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, unless stated otherwise, all measurements are intended to include the stated measurement value together with a surrounding range of values that are within acceptable manufacturing tolerances for the component for which the measurement applies. Similarly, physical property descriptive terms such as "planar" and "parallel" are intended to include variations that fall within acceptable manufacturing tolerances of the physical property for the context in which the term is used. By way of example, in some implementations, manufacturing tolerances may be within (+/−) 10% of a stated value or physical property.

While various example embodiments have been described, it will be understood that certain adaptations and modifications of the described embodiments can be made. Therefore, the above discussed embodiments are considered to be illustrative and not restrictive.

What is claimed is:

1. A component securing unit for mounting to a cooperating surface of a component, comprising:
   a component interface defining a first interface surface region and a second interface surface region;
   a first adhesive material located on the first interface surface region; and
   a second adhesive material having one or more adhesive material properties that are different than adhesive material properties of the first adhesive material, the second adhesive material located on the second interface surface region;
   the component interface, first adhesive material, and second adhesive material co-operatively configured such that the first adhesive material and second adhesive material can each adhere to respective portions of the cooperating surface to mount the component securing unit to the cooperating surface.

2. The component securing unit of claim 1 wherein the second adhesive material surrounds a periphery of the first adhesive material such that the second adhesive material and component interface provide a protective barrier for the first adhesive material when the component securing unit is mounted to the cooperating surface.

3. The component securing unit of claim 2 wherein the first adhesive material has a thicker profile than the second adhesive material and the first interface surface region is set-off relative to the second interface surface region to accommodate the thicker profile.

4. The component securing unit of claim 3 wherein the first interface surface region and a second interface surface region are planar regions and parallel to each other.

5. The component securing unit of claim 3 wherein the first adhesive material has a thickness profile of greater than 30 mils, the second adhesive material has a thickness profile of less than 10 mils, and the first adhesive material has a greater compressibility than the second adhesive material, and the second adhesive material surrounds a periphery of the first adhesive material.

6. The component securing unit of claim 2, wherein the component interface includes a first counterpart that defines the first interface surface region and a second counterpart that defines the second interface surface region.

7. The component securing unit of claim 6 comprising a third counterpart that is removably securable to the component interface, wherein the third counterpart, first counterpart, and second counterpart are co-operatively configured such that the third counterpart, first counterpart, and second counterpart can be locked together using a locking mechanism.

8. The component securing unit of claim 7 wherein the third counterpart, the component interface, first adhesive material, and second adhesive material are co-operatively configured such that, when the component securing unit is mounted to the cooperating surface by the first and second adhesive materials:
   when the third counterpart, first counterpart, and second counterpart are locked together a first normal tension force or a first shearing force is required to remove the locked together third counterpart, first counterpart, and second counterpart from the cooperating surface; and
   when the third counterpart, first counterpart, and second counterpart are not locked together by the locking mechanism and the third counterpart is removed from the component interface, the second counterpart can be removed from the cooperating surface discretely of the first counterpart by applying a second normal tension force that is less than the first normal tension force to overcome a bond of the second adhesive material, and the first counterpart can be subsequently removed from the cooperating surface by applying a second shearing force that is less than the first shearing force to overcome a bond of the first adhesive material.

9. The component securing unit of claim 8 wherein the component is an electronic component, the third counterpart, the component interface, first adhesive material, and second adhesive material being co-operatively configured such that application of either the first normal tension force or the first shearing force when the third counterpart, first counterpart, and second counterpart are locked together and the component securing unit is mounted to the cooperating surface will destroy the electronic component, but application of either the second normal tension force or the second shearing force will not destroy the electronic component.

10. The component securing unit of claim 7 wherein the locking mechanism comprises a threaded fastener extending through a hole through the third counterpart and into a correspondingly threaded hole of the first counterpart.

11. The component securing unit of claim 7 wherein the third counterpart comprises a protruding anchor interface for securing to an anchoring structure.

12. The component securing unit of claim 6 wherein the first counterpart includes a first section that defines the first interface surface region and a second section that extends from the first section, and the second counterpart includes a central opening through which the second section extends when the component securing unit is mounted to the cooperating surface, one or more surfaces being defined at the central opening for interacting with cooperating surfaces of the first section to block the first section from passing through central opening.

13. The component securing unit of claim 1 wherein the first adhesive material comprises a double sided acrylic foam carrier with an acrylic adhesive located on both sides thereof, and the second adhesive material comprises a double sided polyethylene terephthalate (PET) carrier with a rubber based adhesive located on both sides thereof.

14. The component securing unit of claim 1, the component interface, first adhesive material, and second adhesive material being co-operatively configured such that the first adhesive material has a greater normal stress resistance than the second adhesive material and the second adhesive material has a greater shear stress resistance than the first adhesive material.

15. The component securing unit of claim 1 wherein the component interface, first adhesive material, and second adhesive material are co-operatively configured such that the component interface and the second adhesive material provide a physical barrier against external access to the first adhesive material when the component securing unit is mounted to the cooperating surface.

16. A component securing unit for mounting to a component surface, comprising:

a first counterpart having a first section defining a first interface surface region;

a second counterpart defining a second interface surface region;

a first adhesive material located on the first interface surface region; and a second adhesive material located on the second interface surface region;

the first counterpart and second counterpart co-operatively configured such that the first counterpart can be secured to the component surface with the first adhesive material, and the second counterpart can be secured to the component surface with the second adhesive material with the second adhesive material extending about a periphery of the first adhesive material and the second counterpart blocking removal of the first counterpart from the component surface.

17. The component securing unit of claim 16 wherein the first counterpart has a second section that protrudes from the first section, and the second counterpart defines a central opening through which the second section of the first counterpart can extend, the second counterpart defining one or more surfaces about the central opening for interacting with the first section of the first counterpart, the first counterpart and second counterpart co-operatively configured such that the first counterpart and second counterpart can be secured to the component surface with the first section of the first counterpart extending through the central opening of the second counterpart and the one or more surfaces about the central opening interacting with the first section of the first counterpart to block removal of the first counterpart from the component surface in a direction normal to the component surface.

18. The component securing unit of claim 16 wherein the first adhesive material has a thicker profile than the second adhesive material and the first interface surface region is set-off relative to the second interface surface region to accommodate the thicker profile.

19. The component securing unit of claim 16 wherein the first interface surface region and a second interface surface region are planar regions and parallel to each other.

20. The component securing unit of claim 16 comprising a third counterpart that is removably securable to the first counterpart to lock the first counterpart, second counterpart and third counterpart together.

\* \* \* \* \*